(12) United States Patent
Patchava et al.

(10) Patent No.: US 12,231,272 B2
(45) Date of Patent: Feb. 18, 2025

(54) HELPER SIGNAL BASED ENVELOPE TRACKING

(71) Applicant: QUALCOMM Incorporated, San Diego, CA (US)

(72) Inventors: Raviteja Patchava, San Diego, CA (US); Piyush Gupta, Bridgewater, NJ (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 18/323,807

(22) Filed: May 25, 2023

(65) Prior Publication Data

US 2024/0396772 A1    Nov. 28, 2024

(51) Int. Cl.
  *H04L 27/02*   (2006.01)
  *H04L 27/00*   (2006.01)
  *H04L 27/18*   (2006.01)
  *H04L 27/34*   (2006.01)

(52) U.S. Cl.
  CPC .......... *H04L 27/0014* (2013.01); *H04L 27/34* (2013.01); *H04L 2027/0026* (2013.01)

(58) Field of Classification Search
  CPC ..... H04L 27/02; H04L 27/0014; H04L 27/18; H04L 27/34; H04L 2027/0026
  See application file for complete search history.

(56) References Cited

U.S. PATENT DOCUMENTS 8,290,447 B2 * 10/2012 Sutton .................. H04B 1/0475
                                                     455/76
2013/0077584 A1 * 3/2013 Lee .................. H04W 74/0833
                                                     370/329

OTHER PUBLICATIONS

International Search Report and Written Opinion—PCT/US2024/029191—ISA/EPO—Sep. 6, 2024.

(Continued)

*Primary Examiner* — David S Huang
(74) *Attorney, Agent, or Firm* — Paul M. McAdams; Harrity & Harrity, LLP

(57) ABSTRACT

Various aspects of the present disclosure generally relate to wireless communication. In some aspects, a first network entity may receive, from a second network entity, an indication of a first frequency offset associated with the second network entity. In some aspects, the first network entity may receive, from the second network entity, a first transmission including a first communication and a first helper signal that are separated in a frequency domain based on the first frequency offset. In some aspects, the first network entity may decode, via envelope tracking, the first transmission to obtain the first communication from the first transmission. Numerous other aspects are provided.

30 Claims, 14 Drawing Sheets

(56) References Cited

OTHER PUBLICATIONS

Kuo N-C., et al., "Intermodulation Uplink for Far-Field Passive RFID Applications", 2018 IEEE/MTT-S International Microwave Symposium—IMS, IEEE, Jun. 10, 2018, pp. 274-277, XP033387971, figures 1, 9 Sections I., II. and III.
Kuo N-C., et al., "RE-Powered-Tag Intermodulation Uplink With Three-Tone Transmitter for Enhanced Uplink Power", IEEE Journal of Radio Frequency Identification, IEEE, vol. 3, No. 2, Jun. 1, 2019, pp. 56-66, XP011727199, figure 1, Sections I. and Il.
Zhang Y (Samsung)., et al., "Views on Coexistence of Ambient IoT and NR/LTE", 3GPP TSG-RAN WG4 Meeting # 110bis, R4-2404985, Type Discussion, FS_AMBIENT_IOT_SOLUTIONS, 3rd Generation Partnership Project, Mobile Competence Centre, 650, Route Des Lucioles, F-06921 Sophia-Antipolis Cedex, France, vol. 3GPP RAN 4, No. Changsha, Hunan Province, CN, Apr. 15, 2024-Apr. 19, 2024, Apr. 8, 2024, 19 Pages, XP052588229, figure 1, Section 3.1 device 2b with frequency shift, Section 4.

\* cited by examiner

HELPER SIGNAL BASED ENVELOPE TRACKING

FIELD OF THE DISCLOSURE

Aspects of the present disclosure generally relate to wireless communication and to techniques and apparatuses for helper signal based envelope tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network entity for wireless communication. The first network entity may include one or more communication interfaces and one or more processors coupled to the one or more communication interfaces. The first network entity may be configured to receive, via the one or more communication interfaces and from a second network entity, an indication of a first frequency offset associated with the second network entity. The first network entity may be configured to receive, via the one or more communication interfaces and from the second network entity, a first transmission including a first communication and a first helper signal that are separated in a frequency domain based on the first frequency offset. The first network entity may be configured to decode, via envelope tracking, the first transmission to obtain the first communication from the first transmission.

Some aspects described herein relate to a first network entity for wireless communication. The first network entity may include one or more communication interfaces and one or more processors coupled to the one or more communication interfaces. The first network entity may be configured to cause the one or more communication interfaces to communicate, with a second network entity, to negotiate a first frequency offset and a first frequency domain position for communications associated with the first network entity, and a second frequency offset and a second frequency domain position for communications associated with the second network entity. The first network entity may be configured to cause the one or more communication interfaces to transmit an indication, for a third network entity, of the first frequency offset. The first network entity may be configured to cause the one or more communication interfaces to transmit a transmission that includes a communication and a helper signal that are separated in a frequency domain by the first frequency offset, the communication being associated with frequency domain resources in the first frequency domain position.

Some aspects described herein relate to a method of wireless communication performed by a first network entity. The method may include receiving, from a second network entity, an indication of a first frequency offset associated with the second network entity. The method may include receiving, from the second network entity, a first transmission including a first communication and a first helper signal that are separated in a frequency domain based on the first frequency offset. The method may include decoding, via envelope tracking, the first transmission to obtain the first communication from the first transmission.

Some aspects described herein relate to a method of wireless communication performed by a first network entity. The method may include communicating, with a second network entity, to negotiate a first frequency offset and a first frequency domain position for communications associated with the first network entity, and a second frequency offset and a second frequency domain position for communications associated with the second network entity. The method may include transmitting an indication, for a third network entity, of the first frequency offset. The method may include transmitting a transmission that includes a communication and a helper signal that are separated in a frequency domain by the first frequency offset, the communication being associated with frequency domain resources in the first frequency domain position.

Some aspects described herein relate to a non-transitory computer-readable medium having instructions for wireless communication stored thereon. The instructions, when executed by a first network entity, may cause the first network entity to receive, from a second network entity, an indication of a first frequency offset associated with the second network entity. The instructions, when executed by a first network entity, may cause the first network entity to receive, from the second network entity, a first transmission including a first communication and a first helper signal that are separated in a frequency domain based on the first frequency offset. The instructions, when executed by a first network entity, may cause the first network entity to decode, via envelope tracking, the first transmission to obtain the first communication from the first transmission.

Some aspects described herein relate to a non-transitory computer-readable medium having instructions for wireless communication stored thereon. The instructions, when executed by a first network entity, may cause the first network entity to communicate, with a second network entity, to negotiate a first frequency offset and a first frequency domain position for communications associated with the first network entity, and a second frequency offset and a second frequency domain position for communications associated with the second network entity. The instructions, when executed by a first network entity, may cause the first network entity to transmit an indication, for a third network entity, of the first frequency offset. The instructions, when executed by a first network entity, may cause the first network entity to transmit a transmission that includes a communication and a helper signal that are separated in a frequency domain by the first frequency offset, the communication being associated with frequency domain resources in the first frequency domain position.

Some aspects described herein relate to a first apparatus for wireless communication. The first apparatus may include means for receiving, from a second apparatus, an indication of a first frequency offset associated with the second network entity. The first apparatus may include means for receiving, from the second apparatus, a first transmission including a first communication and a first helper signal that are separated in a frequency domain based on the first frequency offset. The first apparatus may include means for decoding, via envelope tracking, the first transmission to obtain the first communication from the first transmission.

Some aspects described herein relate to a first apparatus for wireless communication. The first apparatus may include means for communicating, with a second apparatus, to negotiate a first frequency offset and a first frequency domain position for communications associated with the apparatus, and a second frequency offset and a second frequency domain position for communications associated with the second apparatus. The first apparatus may include means for transmitting an indication, for a third apparatus, of the first frequency offset. The first apparatus may include means for transmitting a transmission that includes a communication and a helper signal that are separated in a frequency domain by the first frequency offset, the communication being associated with frequency domain resources in the first frequency domain position.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing broadly outlines example features and example technical advantages of examples according to the disclosure. Additional example features and example advantages are described hereinafter.

BRIEF DESCRIPTION OF THE DRAWINGS

The appended drawings illustrate certain example aspects of this disclosure and are therefore not limiting in scope. The same reference numbers in different drawings may identify the same or similar elements.

DETAILED DESCRIPTION

Figure 1:
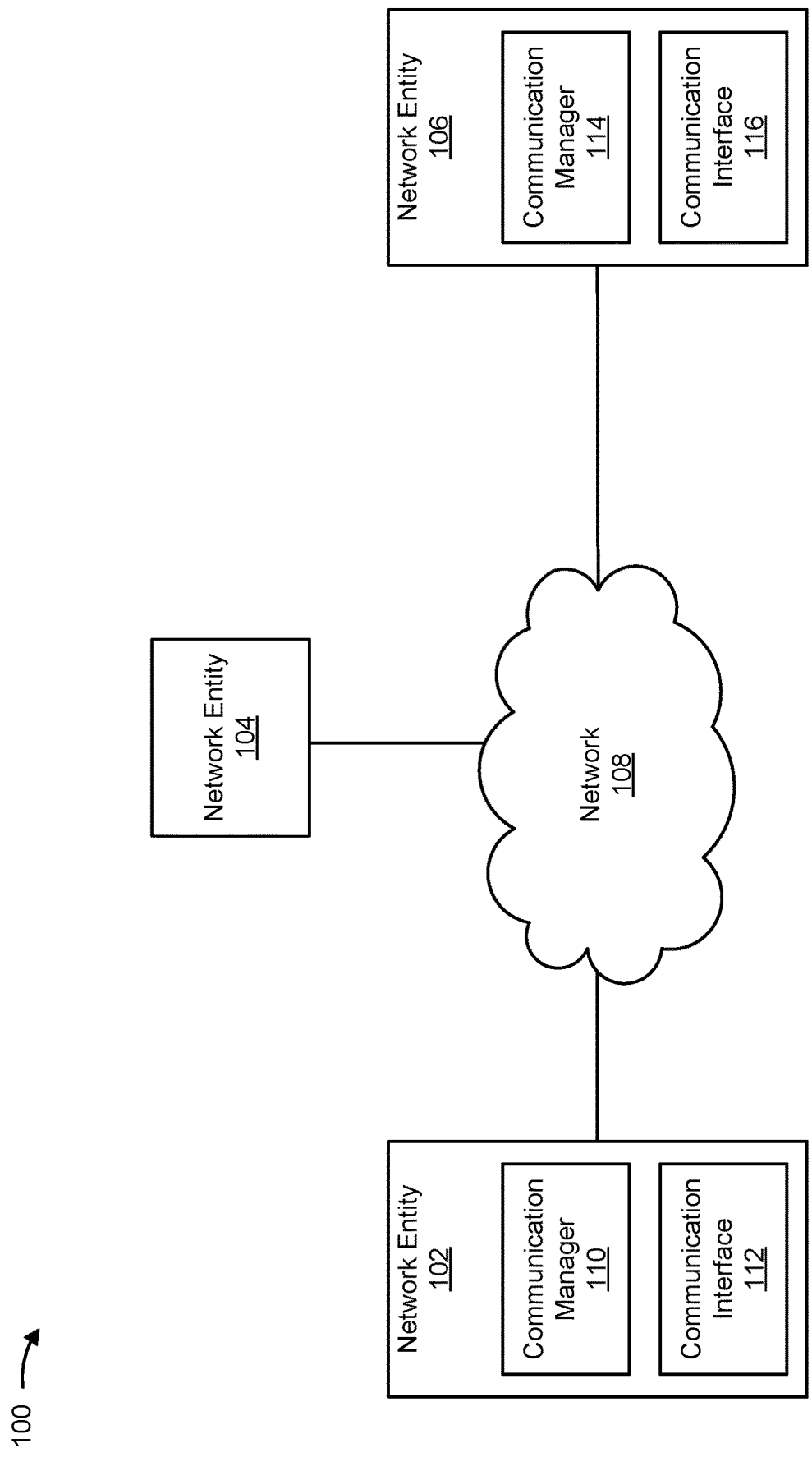
FIG. 1 is a diagram illustrating an example environment in which apparatuses and/or methods described herein may be implemented, in accordance with the present disclosure.

In some examples, envelope tracking may be used by a network entity to decode a wireless signal. For example, envelope tracking can be used as a technique to detect and extract information from a modulated signal. Envelope tracking may be utilized by the network entity as a form of signal demodulation that can recover a baseband signal from a modulated radio frequency (RF) signal. For example, the network entity may receive a signal having a received voltage over time. An amplitude of the signal may vary over time.

The network entity may provide the signal (or information associated with the signal) to an envelope detector. The envelope detector may be configured to detect an envelope associated with the signal. As used herein, an "envelope" of a signal may refer to the amplitude or magnitude of the signal as the amplitude or magnitude varies over time. The envelope may be a function of the modulation applied to the signal. The envelope may be associated with an envelope voltage indicating a voltage of the envelope over time. The network entity may determine information (e.g., bit values) of the signal based on, in accordance with, or otherwise associated with, the envelope voltage. For example, the network entity may be configured to determine whether a voltage of a signal at a given time is to be associated with a "1" or a "0" (e.g., for information bits of the signal) based on, in accordance with, or otherwise associated with, the envelope voltage at the given time. For example, the network entity may compare a voltage of the envelope to one or more thresholds. As an example, if a value of a voltage at a given time satisfies a threshold, then the network entity may determine that a bit corresponding to the given time is associated with a "1". If a value of a voltage at a given time does not satisfy the threshold, then the network entity may determine that a bit corresponding to the given time is associated with a "0".

As a result, a decoding operation performed by the network entity may be simplified and/or associated with reduced complexity. For example, the network entity is enabled to obtain values of the information bits of the signal without using one or more active RF components. Additionally, the network entity is enabled to obtain values of the information bits of the signal without down-converting the signal to a baseband signal. As another example, the envelope tracking decoding operation enables the network entity to obtain values of the information bits of the signal without performing a carrier frequency offset and/or frequency synchronization. As a result, less complex circuitry or components (or fewer components) may be included in the network entity and the network entity may still be enabled to decode modulated signals by using envelope tracking.

However, in some examples, more than one transmitter may be transmitting a signal in a spatial direction toward the network entity at a given time. For example, a first transmitter may be transmitting a first signal to the network entity. The first signal may be a signal intended for the network entity. Another transmitter may be transmitting a second signal in a spatial direction toward the network entity, such that the network entity receives the second signal. The second signal may or may not be intended for the network entity. The first signal and the second signal may at least partially overlap in the time domain. For example, the second signal may interfere with the first signal, causing an amplitude of a received signal at the network entity to be different than an amplitude of the first signal. As a result, the second signal may impact or modify an envelope of the first signal, resulting in the network entity being unable to accurately decode the first signal using the envelope tracking decoding operation described herein. For example, the received signal may be a sum of the data transmitted via the first signal and the second signal. Therefore, the network entity may be unable to extract or recover the individual signals using envelope tracking (e.g., because the envelope includes terms that are a sum of the data transmitted via the first signal and the second signal). As a result, communication performance and/or decoding performance associated with the network entity may be degraded because the network entity may incorrectly decode a signal using envelope tracking when one or more other signals are received by the network entity at a time that at least partially overlaps with the time at which the signal is received by the network entity.

Various aspects relate generally to wireless communication and more particularly to decoding wireless communication signals via envelope tracking. Some aspects more specifically relate to helper signal-based decoding via envelope tracking. In some aspects, a signal, to be decoded via envelope tracking, may include a communication (e.g., data or control information) and a helper signal. In some aspects, a network entity may decode, via envelope tracking, the signal to obtain the communication. As used herein, a helper signal may refer to a single tone that is included in the signal. A tone may be a subcarrier or a resource element. The communication and the helper signal may be separated, in the frequency domain, by a frequency offset. The helper signal may cause information (e.g., terms) of a received signal to be separated in the frequency domain to enable a network entity receiving the signal to isolate information associated with a particular communication. For example, the network entity may modify the received signal (or an envelope of the received signal) based on, in accordance with, or otherwise associated with the frequency offset to isolate the information associated with the particular communication. The network entity may decode the communication using envelope tracking after isolating the information associated with the communication.

For example, a received signal at the network entity may be a summation of multiple transmissions. Helper signals included in respective transmissions of the multiple transmissions may result in information (e.g., for respective transmissions of the multiple transmissions) in the received signal being separated in the frequency domain. For example, a first term may include information indicative of a summation of the multiple transmissions, a second term may include information indicative of a first transmission of the multiple transmissions, a third term may include information indicative of a second transmission of the multiple transmissions, and a fourth term may include information indicative of interference caused by the multiple transmissions, among other examples. Data communications and helper signals may be placed, in the frequency domain, in the respective transmissions to cause the different terms to be separated in the frequency domain such that the different terms may be isolated by the network entity receiving the multiple transmissions. In some aspects, frequency domain locations of the data communications and the helper signals may be determined and/or negotiated based on, in accordance with, or otherwise associated with one or more conditions.

Particular aspects of the subject matter described in this disclosure can be implemented to realize one or more of the following potential advantages. In some aspects, by including a helper signal in a transmission, the described techniques can be used to enable a network entity to decode, using envelope tracking, the transmission to obtain a communication. By using envelope tracking, a complexity associated with decoding the transmission may be reduced. Additionally, by using envelope tracking, the network entity may include fewer (or less complex) RF components, reducing a cost and/or complexity associated with the network entity. In some aspects, the helper signal may cause a term indicative of a communication from a given transmitter to be isolated, in the frequency domain, from terms indicating information associated with other communications from other transmitters. This enables the network entity to modify the received signal and/or the envelope of the received signal to isolate the term indicative of a communication and decode the term, using envelope tracking, to obtain the communication.

In some aspects, values of frequency offsets for respective transmissions may be determined, selected, or negotiated based on, in accordance with, or otherwise associated with the one or more conditions. The one or more conditions may ensure that terms of the received signal are sufficiently separated in the frequency domain to enable the network entity to isolate and/or separate information associated with a particular communication or data when the received signal is a summation of multiple transmissions. Additionally, the one or more conditions may ensure that interference caused by the multiple transmissions occurs in frequency domain locations that do not overlap with the other terms of the received signal.

Various aspects of the disclosure are described more fully hereinafter with reference to the accompanying drawings. This disclosure may, however, be embodied in many different forms and is not limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, network entity, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the example concepts disclosed herein, both their organization and method of operation, together with associated example advantages, are described in the following description and in connection with the accompanying figures. Each of the figures is provided for the purposes of illustration and description, and not as a definition of the limits of the claims. Each of the figures is provided for the purposes of illustration and description, and not as a definition of the limits of the claims.

While aspects are described in the present disclosure by illustration to some examples, those skilled in the art understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described example aspects and example features may include additional example components and example features for implementation and practice of claimed and described aspects. For example, transmission and reception of wireless signals may include one or more components for analog and digital purposes (e.g., hardware components including antennas, RF chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example environment 100 in which apparatuses and/or methods described herein may be implemented, in accordance with the present disclosure. As shown in FIG. 1, the environment 100 may include a network entity 102, a network entity 104, and a network entity 106, that may communicate with one another via a network 108. The network entities 102, 104, and 106, may be dispersed throughout the network 108, and each network entity 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 4G network, a 5G network, a 6G network, or another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In general, any number of networks 108 may be deployed in a given geographic area. Each network 108 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, Open-RAT, NR or 5G RAT networks may be deployed.

In some aspects, the environment 100 may include one or more non-terrestrial network (NTN) deployments in which a non-terrestrial wireless communication device may include a non-terrestrial network entity (e.g., the network entity 102, 104, and 106). The non-terrestrial network entity may include a network entity such as, for example, a user equipment (UE) (which may be referred to herein, interchangeably, as a "non-terrestrial UE"), a base station (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial network entity such as a non-terrestrial UE, a non-terrestrial base station, and/or a non-terrestrial relay station, among other examples.

One or more of the network entities 102, 104, and 106 may be, include, or be included in, any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. Satellites may communicate directly and/or indirectly with other entities in the environment using satellite communication. The other entities may include UEs (e.g., terrestrial UEs and/or non-terrestrial UEs), other satellites in the one or more NTN deployments, other types of base stations (e.g., stationary and/or ground-based base stations), relay stations, and/or one or more components and/or devices included in a core network, among other examples.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity 102 may include a communication manager 110 and one or more communication interfaces 112. The communication manager 110 may be configured to perform one or more communication tasks as described herein. In some aspects, the communication manager 110 may direct the communication interface 112 to perform one or more communication tasks as described herein. Similarly, the network entity 106 may include a communication manager 114 and one or more communication interfaces 116. The communication manager 114 may be configured to perform one or more communication tasks as described herein. In some aspects, the communication manager 114 may direct the communication interface 116 to perform one or more communication tasks as described herein. Although depicted, for clarity of description, with reference only to the network entities 102 and 104, any one or more of the network entities 102, 104, and 106 also may include a communication manager and a communication interface.

As used herein, "communication interface" refers to an interface that enables communication (e.g., wireless communication or wired communication) between a first network entity and a second network entity. A communication interface may include electronic circuitry that enables a network entity to transmit, receive, or otherwise perform the communication. A communication interface may include one or more components that are configured to enable communication between the first network entity and the second network entity. For example, a communication interface may include a transmission component, a reception component, and/or a transceiver, among other examples. Communication interfaces are described in more detail elsewhere herein, such as in connection with FIG. 2.

As described in more detail elsewhere herein, the network entity 102 may (e.g., the communication manager 110 may, or may cause the communication interface 112 to) receive, from a second network entity, an indication of a first frequency offset associated with the second network entity; receive, from the second network entity, a first transmission including a first communication and a first helper signal that are separated in a frequency domain based on the first frequency offset; and/or decode, via envelope tracking, the first transmission to obtain the first communication from the first transmission. Additionally, or alternatively, the network entity 102 and/or the communication manager 110 may perform one or more other operations described herein.

As described in more detail elsewhere herein, the network entity 106 may (e.g., the communication manager 114 may, or may cause the communication interface 116 to) communicate, with a second network entity, to negotiate a first frequency offset and a first frequency domain position for communications associated with the first network entity, and a second frequency offset and a second frequency domain position for communications associated with the second network entity; transmit an indication, for a third network entity, of the first frequency offset; and/or transmit a transmission that includes a communication and a helper signal that are separated in a frequency domain by the first frequency offset, the communication being associated with frequency domain resources in the first frequency domain position. Additionally, or alternatively, the network entity 106 and/or the communication manager 114 may perform one or more other operations described herein.

The number and arrangement of entities shown in FIG. 1 are provided as one or more examples. In practice, there may be additional network entities and/or networks, fewer network entities and/or networks, different network entities and/or networks, or differently arranged network entities and/or networks than those shown in FIG. 1. Furthermore, the network entity 102, 104, and 106 may be implemented using a single apparatus or multiple apparatuses.

Figure 2:
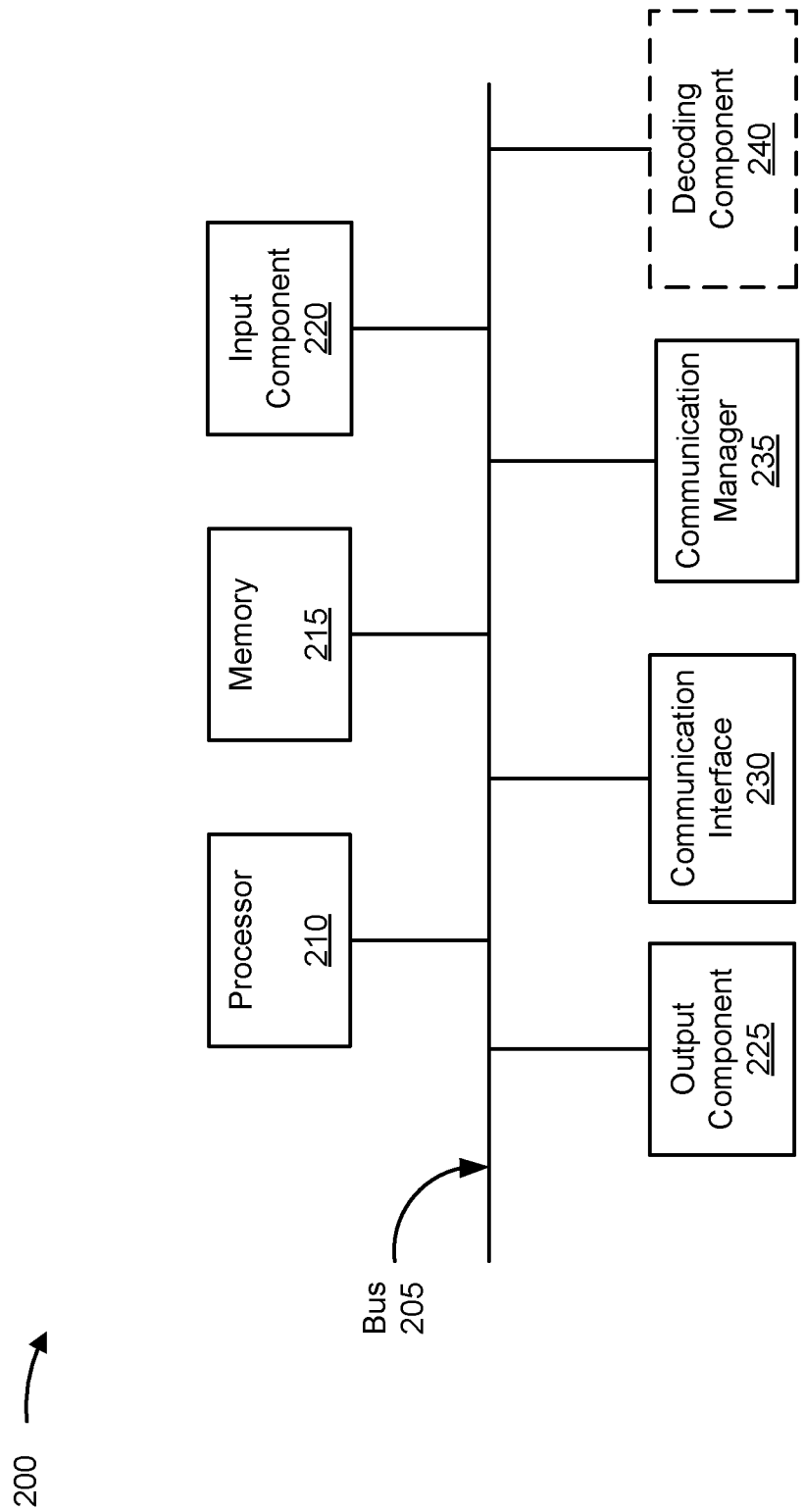
FIG. 2 is a diagram of example components of an apparatus, in accordance with the present disclosure.

FIG. 2 is a diagram of example components of an apparatus 200, in accordance with the present disclosure. The apparatus 200 may correspond to any one or more of the network entities 102, 104, and 106 or another network entity described herein. Additionally, or alternatively, any one or more of the network entities 102, 104, and 106 or another network entity described herein may include one or more apparatuses 200 and/or one or more components of the apparatus 200. For example, in some aspects, the apparatus 200 may include an apparatus (e.g., a device, a device component, a modem, a chip, and/or a set of device components, among other examples) that is configured to perform a wireless communication method, as described herein. As shown in FIG. 2, the apparatus 200 may include components such as a bus 205, a processor 210, a memory 215, an input component 220, an output component 225, a communication interface 230, a communication manager 235, and a decoding component 240. Any one or more of the components 205, 210, 215, 220, 225 230, 235, and/or 240 may be implemented in hardware, software, or a combination of hardware and software.

The bus 205 includes a component that permits communication among the components of the apparatus 200. The processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. In some aspects, the processor 210 includes one or more processors capable of being programmed to perform a function.

The memory 215 includes a random-access memory (RAM), a read only memory (ROM), and/or another type of dynamic or static storage device (e.g., a flash memory, a magnetic memory, and/or an optical memory) that stores information and/or instructions for use by the processor 210. The memory 215 may store other information and/or software related to the operation and use of the apparatus 200. For example, the memory 215 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium.

The input component 220 includes a component that permits the apparatus 200 to receive information, such as via user input. For example, the input component 220 may be associated with a user interface as described herein (e.g., to permit a user to interact with the one or more features of the apparatus 200). The input component 220 may include a capacitive touchscreen display that can receive user inputs. The input component 220 may include a keyboard, a keypad, a mouse, a button, a switch, and/or a microphone, among other examples. Additionally, or alternatively, the input component 220 may include a sensor for sensing information (e.g., a vision sensor, a location sensor, an accelerometer, a gyroscope, and/or an actuator, among other examples). In some aspects, the input component 220 may include a camera (e.g., a high-resolution camera and/or a low-resolution camera, among other examples). The output component 225 may include a component that provides output from the apparatus 200 (e.g., a display, a speaker, and/or one or more light-emitting diodes (LEDs), among other examples).

The communication interface 230 may include a transmission component and/or a reception component. For example, the communication interface 230 may include a transceiver and/or one or more separate receivers and/or transmitters that enable the apparatus 200 to communicate with other devices, such as via a wired connection, a wireless connection, or a combination of wired and wireless connections. In some aspects, the communication interface may include one or more radio frequency reflective elements and/or one or more radio frequency refractive elements. The communication interface 230 may permit the apparatus 200 to receive information from another apparatus and/or provide information to another apparatus. For example, the communication interface 230 may include an Ethernet interface, an optical interface, a coaxial interface, an infrared interface, an RF interface, a universal serial bus (USB) interface, a Wi-Fi interface, a cellular network interface, a wireless modem, an inter-integrated circuit ($I^2C$), and/or a serial peripheral interface (SPI), among other examples.

The communication manager 235 may include hardware, software, or a combination of hardware and software configured to cause the apparatus 200 to perform one or more communication tasks associated with the communication manager 110 and/or the communication interface 112 or the communication interface 230. Similarly, the communication manager 235 may include hardware, software, or a combination of hardware and software configured to cause the apparatus 200 to perform one or more communication tasks associated with the communication manager 114 and/or the communication interface 116 or the communication interface 230. In some aspects, the communication manager 235 may be, be similar to, include, or be included in, the communication manager 110 and/or the communication manager 114 depicted in FIG. 1. In some aspects, the communication manager 235 may include the processor 210, the memory 215, the input component 220, the output component 225, the communication interface 230, and/or the decoding component 240, and/or one or more aspects thereof.

As indicated above, FIG. 2 is provided as an example. Other examples may differ from what is described with regard to FIG. 2.

As described above, in some aspects, the network 108 depicted in FIG. 1 may include a cellular network that includes a RAT. While some aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 3:
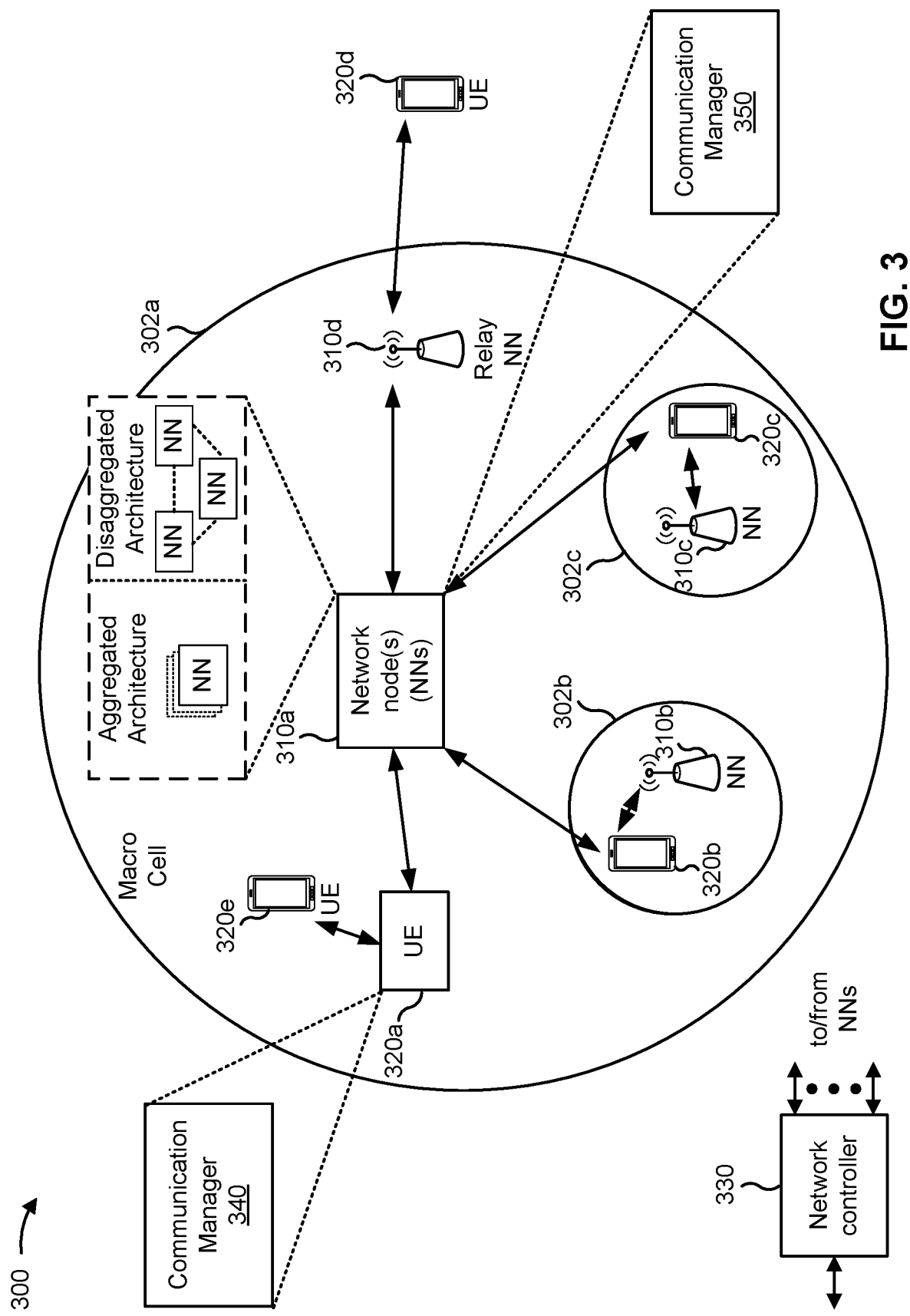
FIG. 3 is a diagram illustrating an example of a wireless network, in accordance with the present disclosure.

FIG. 3 is a diagram illustrating an example of a wireless network 300, in accordance with the present disclosure. The wireless network 300 may be or may include elements of a 4G (e.g., LTE) network, a 5G (e.g., NR) network, and/or, a 6G network, among other examples. The wireless network 300 may include one or more network nodes 310 (shown as a network node 310a, a network node 310b, a network node 310c, and a network node 310d), a UE 320 or multiple UEs 320 (shown as a UE 320a, a UE 320b, a UE 320c, a UE 320d, and a UE 320e), and/or other entities. A network node 310 is a network node that communicates with UEs 320. As shown, a network node 310 may include one or more network nodes. For example, a network node 310 may be an aggregated network node, meaning that the aggregated network node is configured to utilize a radio protocol stack that is physically or logically integrated within a single radio access network (RAN) node (e.g., within a single device or unit). As another example, a network node 310 may be a disaggregated network node (sometimes referred to as a disaggregated base station), meaning that the network node 310 is configured to utilize a protocol stack that is physically or logically distributed among two or more nodes (such as one or more CUs, one or more DUs, or one or more RUs).

In some examples, a network node 310 is or includes a network node that communicates with UEs 320 via a radio access link, such as an RU. In some examples, a network node 310 is or includes a network node that communicates with other network nodes 310 via a fronthaul link or a midhaul link, such as a DU. In some examples, a network node 310 is or includes a network node that communicates with other network nodes 310 via a midhaul link or a core network via a backhaul link, such as a CU. In some examples, a network node 310 (such as an aggregated network node 310 or a disaggregated network node 310) may include multiple network nodes, such as one or more RUs, one or more CUs, and/or one or more DUs. A network node 310 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 310 may be interconnected to one another or to one or more other network nodes 310 in the wireless network 300 through various types of fronthaul, midhaul, and/or backhaul interfaces, such as a direct physical connection, an air interface, or a virtual network, using any suitable transport network.

In some examples, a network node 310 may provide communication coverage for a particular geographic area. In the Third Generation Partnership Project (3GPP), the term "cell" can refer to a coverage area of a network node 310 and/or a network node subsystem serving this coverage area, depending on the context in which the term is used. A network node 310 may provide communication coverage for a macro cell, a pico cell, a femto cell, and/or another type of cell. A macro cell may cover a relatively large geographic area (e.g., several kilometers in radius) and may allow unrestricted access by UEs 320 with service subscriptions. A pico cell may cover a relatively small geographic area and may allow unrestricted access by UEs 320 with service subscriptions. A femto cell may cover a relatively small geographic area (e.g., a home) and may allow restricted access by UEs 320 having association with the femto cell (e.g., UEs 320 in a closed subscriber group (CSG)). A network node 310 for a macro cell may be referred to as a macro network node. A network node 310 for a pico cell may be referred to as a pico network node. A network node 310 for a femto cell may be referred to as a femto network node or an in-home network node. In the example shown in FIG. 3, the network node 310a may be a macro network node for a macro cell 302a, the network node 310b may be a pico network node for a pico cell 302b, and the network node 310c may be a femto network node for a femto cell 302c. A network node may support one or multiple (e.g., three) cells. In some examples, a cell may not necessarily be stationary, and the geographic area of the cell may move according to the location of a network node 310 that is mobile (e.g., a mobile network node).

In some aspects, the terms "base station" or "network entity" may refer to an aggregated base station, a disaggregated base station, an IAB node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the network node 310. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 300 may include one or more relay stations. A relay station is a network node that can receive a transmission of data from an upstream node (e.g., a network node 310 or a UE 320) and send a transmission of the data to a downstream node (e.g., a UE 320 or a network node 310). A relay station may be a UE 320 that can relay transmissions for other UEs 320. In the example shown in FIG. 3, the network node 310*d*(e.g., a relay network node) may communicate with the network node 310*a* (e.g., a macro network node) and the UE 320*d* in order to facilitate communication between the network node 310*a* and the UE 320*d*. A network node 310 that relays communications may be referred to as a relay station, a relay base station, a relay network node, a relay node, a relay, or the like.

The wireless network 300 may be a heterogeneous network that includes network nodes 310 of different types, such as macro network nodes, pico network nodes, femto network nodes, relay network nodes, or the like. These different types of network nodes 310 may have different transmit power levels, different coverage areas, and/or different impacts on interference in the wireless network 300. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 330 may couple to or communicate with a set of network nodes 310 and may provide coordination and control for these network nodes 310. The network controller 330 may communicate with the network nodes 310 via a backhaul communication link or a midhaul communication link. The network nodes 310 may communicate with one another directly or indirectly via a wireless or wireline backhaul communication link. In some aspects, the network controller 330 may be a CU or a core network device, or may include a CU or a core network device.

For example, in some aspects, the wireless network 300 may be, include, or be included in a wireless backhaul network, sometimes referred to as an IAB network. In an IAB network, at least one network entity (e.g., network node 310) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 320) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target network entity (e.g., a UE and/or a base station). In this way, inter-link interference may be reduced.

An IAB network may include an IAB donor that connects to a core network via a wired connection (e.g., a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a network node 310, such as an anchor base station. An IAB donor may include a CU, which may perform access node controller (ANC) functions and/or AMF functions. The CU may configure a DU of the IAB donor and/or may configure one or more IAB nodes (e.g., a mobile termination (MT) function and/or a DU function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (e.g., a radio resource control (RRC) configuration message or an F1 application protocol (F1AP) message).

The MT functions of an IAB node (e.g., a child node) may be controlled and/or scheduled by another IAB node (e.g., a parent node of the child node) and/or by an IAB donor. The DU functions of an IAB node (e.g., a parent node) may control and/or schedule other IAB nodes (e.g., child nodes of the parent node) and/or UEs 320. Thus, a DU may be referred to as a scheduling node or a scheduling component, and an MT may be referred to as a scheduled node or a scheduled component. In some aspects, an IAB donor may include DU functions and not MT functions. That is, an IAB donor may configure, control, and/or schedule communications of IAB nodes and/or UEs 320. A UE 320 may include only MT functions, and not DU functions. That is, communications of a UE 320 may be controlled and/or scheduled by an IAB donor and/or an IAB node (e.g., a parent node of the UE 320).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor or an IAB node, and a child node may be an IAB node or a UE 320. Communications of an MT function of a child node may be controlled and/or scheduled by a parent node of the child node.

A link between a UE 320 and an IAB donor, or between a UE 320 and an IAB node, may be referred to as an access link. An access link may be a wireless access link that provides a UE 320 with radio access to a core network via an IAB donor, and optionally via one or more IAB nodes. Thus, the wireless network 300 may be referred to as a multi-hop network or a wireless multi-hop network.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (e.g., time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

The UEs 320 may be dispersed throughout the wireless network 300, and each UE 320 may be stationary or mobile. A UE 320 may include, for example, an access terminal, a terminal, a mobile station, and/or a subscriber unit. A UE 320 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 320 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 320 may be considered Internet-of-Things (IoT) devices, and/or may be implemented as NB-IoT (narrowband IoT) devices. Some UEs 320 may be considered a Customer Premises Equipment. A UE 320 may be included inside a housing that houses components of the UE 320, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

Some network nodes may have a reduced feature set compared to other network nodes. A network node with a reduced feature set may be referred to as a reduced capability (RedCap) node, a low-tier node, an NR-Lite node, an IoT node, an ambient IoT node, a passive node, a terminal (e.g., a radio frequency identification (RFID) device, a tag, or a similar device), and/or an energy-harvesting-capable node, among other examples. For example, a node with a reduced feature set may support a lower maximum modulation and coding scheme (MCS) than other nodes (e.g., quadrature phase shift keying (QPSK) or the like as compared to 256-quadrature amplitude modulation (QAM) or the like), may support a lower maximum transmit power, may have a less advanced beamforming capability (e.g., may not be capable of forming as many beams as other nodes), may require a longer processing time, may include less hardware (e.g., fewer antennas, fewer RF components, fewer transmit antennas, and/or fewer receive antennas), and/or may not be capable of communicating on as wide of a maximum bandwidth, among other examples.

For example, some network nodes may not include a battery, and the node may accumulate energy from radio signaling. The network node may be a passive network node. A passive network node may be without energy storage or with energy storage. A passive network node without energy storage may include a capacitor to instantaneously (or near-instantaneously) provide energy from the RF to the passive network node. A passive network node with energy storage may have some limited energy storage capability. In some examples, a network node (e.g., a RedCap network node, a low-tier network node, a passive network node, an RFID device, a tag, or an energy-harvesting-capable network node) may include a reduced set of RF components. For example, some network nodes may not include an oscillator, power amplifier, and/or other active RF components.

In general, any number of wireless networks 300 may be deployed in a given geographic area. Each wireless network 300 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 320 (e.g., shown as UE 320a and UE 320e) may communicate directly using one or more sidelink channels (e.g., without using a network node 310 as an intermediary to communicate with one another). For example, the UEs 320 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 320 may perform scheduling operations, resource selection operations, and/or other operations described elsewhere herein as being performed by the network node 310.

Devices of the wireless network 300 may communicate using the electromagnetic spectrum, which may be subdivided by frequency or wavelength into various classes, bands, channels, or the like. For example, devices of the wireless network 300 may communicate using one or more operating bands. In 5G NR, two initial operating bands have been identified as frequency range designations FR1(410 MHZ-7.125 GHZ) and FR2(24.25 GHz-52.6 GHz). Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 may be referred to as mid-band frequencies. Recent 5G NR studies have identified an operating band for these mid-band frequencies as frequency range designation FR3(7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4(52.6 GHZ-114.25 GHZ), and FR5(114.25 GHZ-300 GHZ). Each of these higher frequency bands falls within the EHF band.

With the above examples in mind, unless specifically stated otherwise, the term "sub-6 GHz" or the like, if used herein, may broadly represent frequencies that may be less than 6 GHz, may be within FR1, or may include mid-band frequencies. Further, unless specifically stated otherwise, the term "millimeter wave" or the like, if used herein, may broadly represent frequencies that may include mid-band frequencies, may be within FR2, FR4, FR4-a or FR4-1, and/or FR5, or may be within the EHF band. The frequencies included in these operating bands (e.g., FR1, FR2, FR3, FR4, FR4-a, FR4-1, and/or FR5) may be modified, and techniques described herein are applicable to those modified frequency ranges.

As described above, in some aspects, a network entity (e.g., the network entity 102, 104, and/or 106 depicted in FIG. 1) may be implemented in a wireless communication environment. For example, in some aspects, the network node may be implemented as a UE, a base station, relay device, and/or TRP, among other examples. In some such aspects, as shown in FIG. 3, the UE 320a may include a communication manager 340 and/or a transceiver and the network node 310a may include a communication manager 350 and/or a transceiver. In some aspects, the communication manager 340 and/or 350 may be, be similar to, include, or be included in, the communication manager 110 and/or the communication manager 114 depicted in FIG. 1 and/or the communication manager 235 depicted in FIG. 2. In some aspects, the transceiver(s) may be, be similar to, include, or be included in, the communication interface 112 and/or the communication interface 116 depicted in FIG. 1. In some aspects, the transceiver(s) may include, or be included in, the communication interface 230 depicted in FIG. 2.

In some aspects, the UE 320 may include a communication manager 340. As described in more detail elsewhere herein, the communication manager 340 may receive, from a second network entity, an indication of a first frequency offset associated with the second network entity; receive, from the second network entity, a first transmission including a first communication and a first helper signal that are separated in a frequency domain based on the first frequency offset; and/or decode, via envelope tracking, the first transmission to obtain the first communication from the first transmission. Additionally, or alternatively, the communication manager 340 may perform one or more other operations described herein.

In some aspects, the network node 310 may include a communication manager 350. As described in more detail elsewhere herein, the communication manager 350 may communicate, with a second network entity, to negotiate a first frequency offset and a first frequency domain position for communications associated with the first network entity, and a second frequency offset and a second frequency domain position for communications associated with the second network entity; transmit an indication, for a third network entity, of the first frequency offset; and/or transmit a transmission that includes a communication and a helper signal that are separated in a frequency domain by the first frequency offset, the communication being associated with frequency domain resources in the first frequency domain position. Additionally, or alternatively, the communication manager 350 may perform one or more other operations described herein.

As indicated above, FIG. 3 is provided as an example. Other examples may differ from what is described with regard to FIG. 3.

Figure 4:
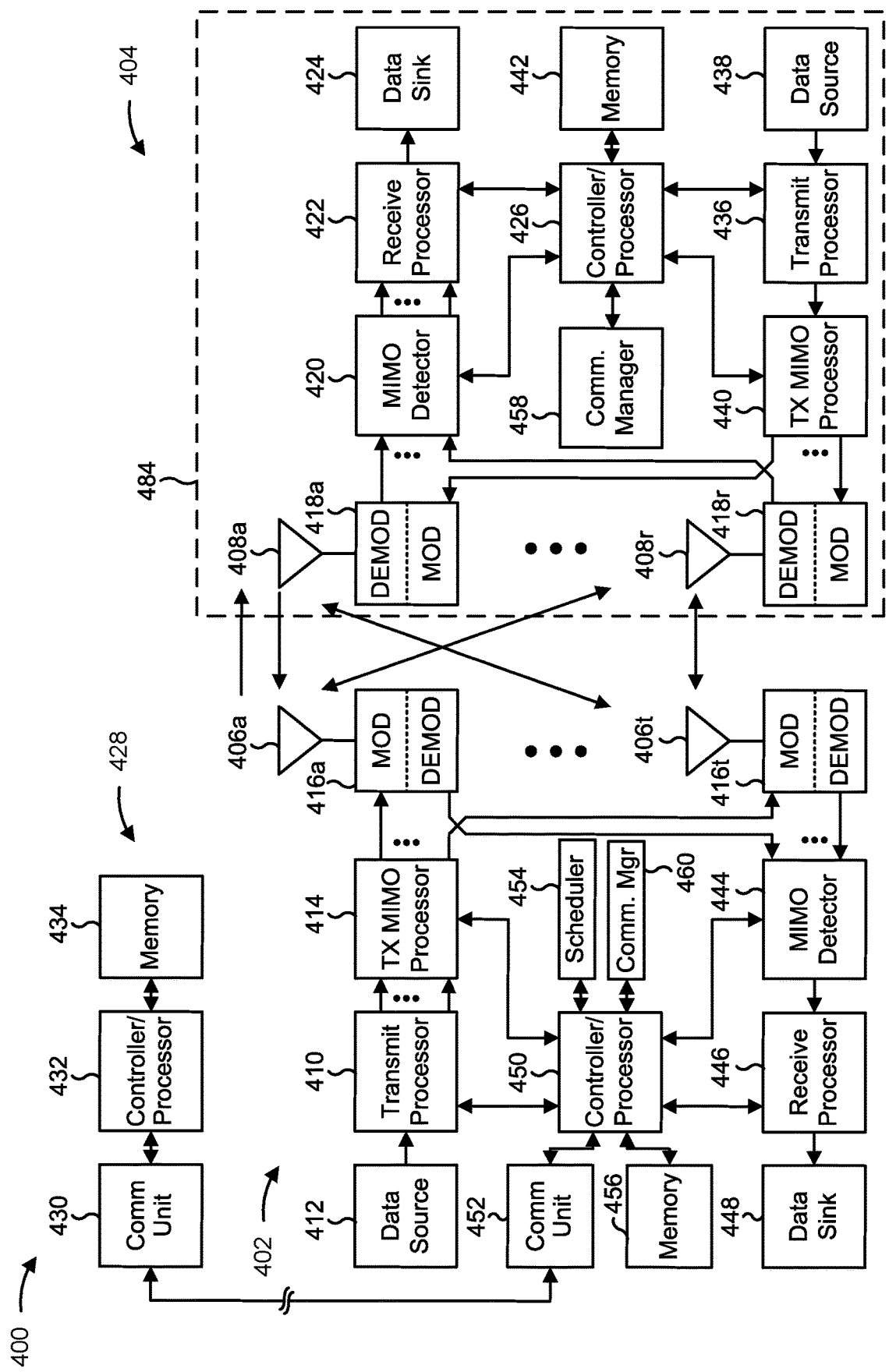
FIG. 4 is a diagram illustrating an environment including a first network entity in wireless communication with a second network entity, in accordance with the present disclosure.

FIG. 4 is a diagram illustrating an environment 400 including a network entity 402 in wireless communication with a network entity 404 (e.g., via a network such as the network 108 depicted in FIG. 1 and/or the wireless network 300 depicted in FIG. 3), in accordance with the present disclosure. The network entity 402 may be equipped with a set of antennas 406a through 406t, such as T antennas (T≥1). The network entity 404 may be equipped with a set of antennas 408a through 408r, such as R antennas (R≥1).

At the network entity 402, a transmit processor 410 may receive data, from a data source 412, intended, or otherwise destined, for the network entity 404 (or a set of network entities 404). The transmit processor 410 may select one or more MCSs for the network entity 404 based on one or more channel quality indicators (CQIs) received from that network entity 404. The network entity 402 may process (e.g., encode and modulate) the data for the network entity 404 based on the MCS(s) selected for the network entity 404 and may provide data symbols for the network entity 404. The transmit processor 410 may process system information (e.g., for semi-static resource partitioning information (SRPI)) and control information (e.g., CQI requests, grants, and/or upper layer signaling) and provide overhead symbols and control symbols. The transmit processor 410 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 414 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 416a through 416t (e.g., T modems). For example, each output symbol stream may be provided to a modulator component (shown as MOD) of a modem of the set of modems 416a through 416t. Each modem of the set of modems 416a through 416t may use a respective modulator component to process a respective output symbol stream (e.g., for OFDM) to obtain an output sample stream. Each modem of the set of modems 416a through 416t may further use a respective modulator component to process (e.g., convert to analog, amplify, filter, and/or upconvert) the output sample stream to obtain a signal. One or more modems of the set of modems 416a through 416t may transmit a set of signals (e.g., T signals) via a corresponding antenna of the set of antennas 406a through 406t. The signal may include, for example, a downlink signal.

At the network entity 404, one or more antennas of the set of antennas 408a through 408r may receive the signals from the network entity 402 and/or network nodes and may provide a set of received signals (e.g., R received signals) to one or more modems of a set of modems 418a through 418r (e.g., R modems). For example, each received signal may be provided to a demodulator component (shown as DEMOD) of a respective modem of the set of modems 418a through 418r. Each modem of the set of modems 418a through 418r may use a respective demodulator component to condition (e.g., filter, amplify, downconvert, and/or digitize) a received signal to obtain input samples. Each modem of the set of modems 418a through 418r may use a demodulator component to further process the input samples (e.g., for OFDM) to obtain received symbols. A MIMO detector 420 may obtain received symbols from one or more modems of the set of modems 418a through 418r, may perform MIMO detection on the received symbols if applicable, and may provide detected symbols.

A receive processor 422 may process (e.g., demodulate and decode) the detected symbols, may provide decoded data for the network entity 404 to a data sink 424, and may provide decoded control information and system information to a controller/processor 426. The term "controller/processor" may refer to one or more controllers, one or more processors, or a combination thereof. The controller/processor 426 may be, be similar to, include, or be included in, the processor 210 depicted in FIG. 2. The controller/processor 426 may determine a reference signal received power (RSRP) parameter, a received signal strength indicator (RSSI) parameter, a reference signal received quality (RSRQ) parameter, and/or a CQI parameter, among other examples.

A network controller 428 may include a communication unit 430, a controller/processor 432, and a memory 434. The network controller 428 may be, be similar to, include, or be included in, the network controller 330 depicted in FIG. 3. The network controller 428 may include, for example, one or more devices in a core network. The network controller 428 may communicate with the network entity 402 via the communication unit 430.

One or more antennas (e.g., antennas 406a through 406t and/or antennas 408a through 408r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings, such as a housing 484), a set of coplanar antenna elements, a set of non-coplanar antenna elements, and/or one or more antenna elements coupled to one or more transmission and/or reception components, such as one or more components of FIG. 4.

Similarly, at the network entity 404, a transmit processor 436 may receive and process data from a data source 438 and control information (e.g., for reports that include RSRP, RSSI, RSRQ, and/or CQI) from the controller/processor 426. The transmit processor 436 may generate reference symbols for one or more reference signals. The symbols from the transmit processor 436 may be precoded by a TX MIMO processor 440 if applicable, and further processed by one or more of the set of modems 418a through 418r(e.g., for DFT-s-OFDM or CP-OFDM), and transmitted to the network entity 402. In some examples, each modem of the set of modems 418a through 418r of the network entity 404 may include a modulator and a demodulator. The network entity 404 may include a communication manager 458. The communication manager 458 may be, or may be similar to, the communication manager 110, the communication manager 114, the communication manager 235, the communication manager 340, and/or the communication manager 350. In some examples, the network entity 404 includes a transceiver. The transceiver may include any combination of the antenna(s) 408a through 408r, the modem(s) 418a through 418r, the MIMO detector 420, the receive processor 422, the transmit processor 436, and/or the TX MIMO processor 440. The transceiver may be, be similar to, include, or be included in, the communication interface 112 and/or the communication interface 116 depicted in FIG. 1 and/or the communication interface 230 depicted in FIG. 2. The transceiver may be used by a processor (e.g., the controller/processor 426) and/or a memory 442 to perform aspects of any of the methods described herein (e.g., with reference to FIGS. 8-14).

At the network entity 402, the signals from network entity 404 and/or other network nodes may be received by one or more antennas of the set of antennas 406a through 406t, processed by one or more modems of the set of modems 416a through 416t (e.g., a demodulator component, shown as DEMOD), detected by a MIMO detector 444 if applicable, and further processed by a receive processor 446 to obtain decoded data and control information sent by the network entity 404. The receive processor 446 may provide the decoded data to a data sink 448 and provide the decoded control information to a controller/processor 450. The network entity 402 may include a communication unit 452 and may communicate with the network controller 428 via the communication unit 452. The network entity 402 may include a communication manager 460. The communication manager 460 may be, or may be similar to, the communication manager 110, the communication manager 114, the communication manager 235, the communication manager 340, and/or the communication manager 350. The network entity 402 may include a scheduler 454 to schedule one or more network entities 404 for downlink and/or uplink communications. In some examples, one or more modems of the set of modem 416a through 416t of the network entity 402 may include a modulator and a demodulator. In some examples, the network entity 402 includes a transceiver. The transceiver may include any combination of the antenna(s) 406a through 406t, the modem(s) 416a through 416t, the MIMO detector 444, the receive processor 446, the transmit processor 410, and/or the TX MIMO processor 414. The transceiver may be, be similar to, include, or be included in, the communication interface 112 and/or the communication interface 116 depicted in FIG. 1 and/or the communication interface 230 depicted in FIG. 2. The transceiver may be used by a processor (e.g., the controller/processor 450) and a memory 456 to perform aspects of any of the methods described herein (e.g., with reference to FIGS. 8-14).

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

The controller/processor 450 of the network entity 402, the controller/processor 426 of the network entity 404, and/or any other component(s) of FIG. 4 may perform one or more techniques associated with helper signal based envelope tracking, as described in more detail elsewhere herein. For example, the controller/processor 450 of the network entity 402, the controller/processor 426 of the network entity 404, and/or any other component(s) of FIG. 4 may perform or direct operations of, for example, process 1100 of FIG. 11, process 1200 of FIG. 12, and/or other processes as described herein. The memory 442 and the memory 456 may store data and program codes for the network entity 402 and the network entity 404, respectively. In some examples, the memory 442 and/or the memory 456 may include a non-transitory computer-readable medium storing one or more instructions (e.g., code and/or program code) for wireless communication. For example, the one or more instructions, when executed (e.g., directly, or after compiling, converting, and/or interpreting) by one or more respective processors of the network entity 402 and/or the network entity 404, may cause the one or more processors, the network entity 404, and/or the network entity 402 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a first network entity (e.g., the network entity 402 or the network entity 404) includes means for receiving, from a second network entity, an indication of a first frequency offset associated with the second network entity; means for receiving, from the second network entity, a first transmission including a first communication and a first helper signal that are separated in a frequency domain based on the first frequency offset; and/or means for decoding, via envelope tracking, the first transmission to obtain the first communication from the first transmission. In some aspects, the means for the first network entity to perform operations described herein may include, for example, one or more of communication manager 460, transmit processor 410, TX MIMO processor 414, modem 416, antenna 406, MIMO detector 444, receive processor 446, controller/processor 450, memory 456, scheduler 454, the communication interface 112, the communication interface 116, and/or the communication interface 230, among other examples. In some aspects, the means for the first network entity to perform operations described herein may include, for example, one or more of communication manager 458, antenna 408, modem 418, MIMO detector 420, receive processor 422, transmit processor 436, TX MIMO processor 440, controller/processor 426, memory 442, the communication interface 112, the communication interface 116, and/or the communication interface 230, among other examples.

In some aspects, a first network entity (e.g., the network entity 402 or the network entity 404) includes means for communicating, with a second network entity, to negotiate a first frequency offset and a first frequency domain position for communications associated with the first network entity, and a second frequency offset and a second frequency domain position for communications associated with the second network entity; means for transmitting an indication, for a third network entity, of the first frequency offset; and/or means for transmitting a transmission that includes a communication and a helper signal that are separated in a frequency domain by the first frequency offset, the communication being associated with frequency domain resources in the first frequency domain position. In some aspects, the means for the first network entity to perform operations described herein may include, for example, one or more of communication manager 460, transmit processor 410, TX MIMO processor 414, modem 416, antenna 406, MIMO detector 444, receive processor 446, controller/processor 450, memory 456, scheduler 454, the communication interface 112, the communication interface 116, and/or the communication interface 230, among other examples. In some aspects, the means for the first network entity to perform operations described herein may include, for example, one or more of communication manager 458, antenna 408, modem 418, MIMO detector 420, receive processor 422, transmit processor 436, TX MIMO processor 440, controller/processor 426, memory 442, the communication interface 112, the communication interface 116, and/or the communication interface 230, among other examples.

While blocks in FIG. 4 are illustrated as distinct components, the functions described above with respect to the blocks may be implemented in a single hardware, software, or combination component or in various combinations of components. For example, the functions described with respect to the transmit processor 436, the receive processor 422, and/or the TX MIMO processor 440 may be performed by or under the control of the controller/processor 426. Any number of other combination of various combinations of components depicted in FIG. 4 may be considered to be within the ambit of the present disclosure.

As indicated above, FIG. 4 is provided as an example. Other examples may differ from what is described with regard to FIG. 4.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network entities. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

As used herein, a first network entity "outputting" or "transmitting" a communication to a second network entity may refer to a direct transmission (for example, from the first network entity to the second network entity) or an indirect transmission via one or more other network entities or devices. For example, if the first network entity is a DU, an indirect transmission to the second network entity may include the DU outputting or transmitting a communication to an RU and the RU transmitting the communication to the second network entity, or may include causing the RU to transmit the communication (e.g., triggering transmission of a physical layer reference signal). Similarly, the second network entity "transmitting" a communication to the first network entity may refer to a direct transmission (e.g., from the second network entity to the first network entity) or an indirect transmission via one or more other network entities or devices. For example, if the first network entity is a DU, an indirect transmission to the first network entity may include the second network entity transmitting a communication to an RU and the RU transmitting the communication to the DU. Similarly, the first network entity "obtaining" a communication may refer to receiving a transmission carrying the communication directly (for example, from the second network entity to the first network entity) or receiving the communication (or information derived from reception of the communication) via one or more other network entities or devices.

Figure 5:
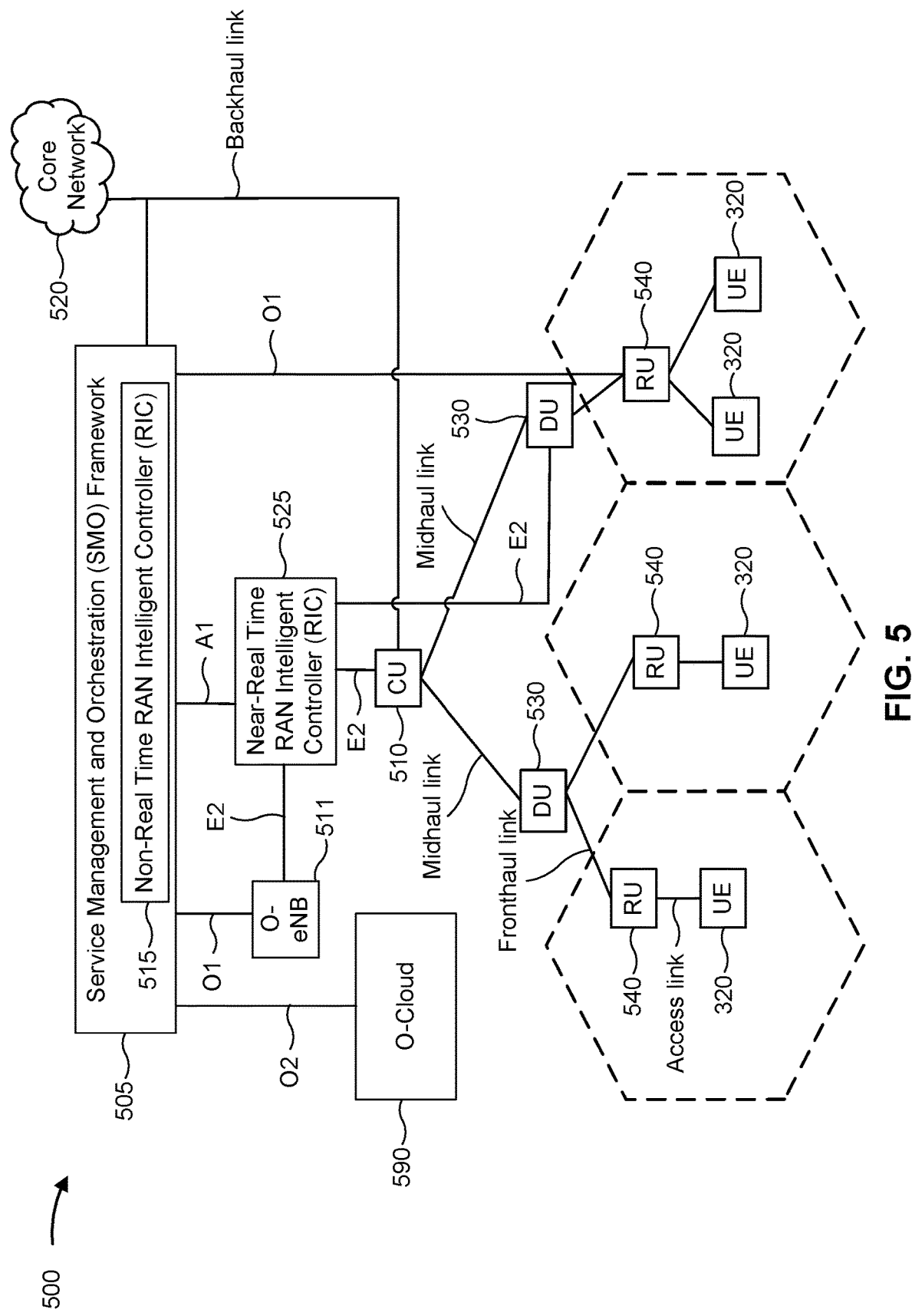
FIG. 5 is a diagram illustrating an example disaggregated base station architecture, in accordance with the present disclosure.

FIG. 5 is a diagram illustrating an example disaggregated base station architecture 500, in accordance with the present disclosure. The disaggregated base station architecture 500 may include a CU 510 that can communicate directly with a core network 520 via a backhaul link, or indirectly with the core network 520 through one or more disaggregated control units (such as a Near-RT RIC 525 via an E2 link, or a Non-RT RIC 515 associated with a Service Management and Orchestration (SMO) Framework 505, or both). A CU 510 may communicate with one or more DUs 530 via respective midhaul links, such as through F1 interfaces. Each of the DUs 530 may communicate with one or more RUs 540 via respective fronthaul links. Each of the RUs 540 may communicate with one or more UEs 320 via respective RF access links. In some implementations, a UE 320 may be simultaneously served by multiple RUs 540.

Each of the units, including the CUs 510, the DUs 530, the RUs 540, as well as the Near-RT RICs 525, the Non-RT RICs 515, and the SMO Framework 505, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 510 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 510. The CU 510 may be configured to handle user plane functionality (for example, Central Unit-User Plane (CU-UP) functionality), control plane functionality (for example, Central Unit-Control Plane (CU-CP) functionality), or a combination thereof. In some implementations, the CU 510 can be logically split into one or more CU-UP units and one or more CU-CP units. A CU-UP unit can communicate bidirectionally with a CU-CP unit via an interface, such as the E1 interface when implemented in an O-RAN configuration. The CU 510 can be implemented to communicate with a DU 530, as necessary, for network control and signaling.

Each DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 530 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 530, or with the control functions hosted by the CU 510.

Each RU 540 may implement lower-layer functionality. In some deployments, an RU 540, controlled by a DU 530, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 540 can be operated to handle over the air (OTA) communication with one or more UEs 320. In some implementations, real-time and non-real-time aspects of control and user plane communication with the RU(s) 540 can be controlled by the corresponding DU 530. In some scenarios, this configuration can enable each DU 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements, which may be managed via an operations and maintenance interface (such as an O1 interface). For virtualized network elements, the SMO Framework 505 may be configured to interact with a cloud computing platform (such as an open cloud (O-Cloud) platform 590) to perform network element life cycle management (such as to instantiate virtualized network elements) via a cloud computing platform interface (such as an O2 interface). Such virtualized network elements can include, but are not limited to, CUs 510, DUs 530, RUs 540, non-RT RICs 515, and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with each of one or more RUs 540 via a respective O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via an O1 interface) or via creation of RAN management policies (such as A1 interface policies).

As indicated above, FIG. 5 is provided as an example. Other examples may differ from what is described with regard to FIG. 5.

Figure 6:
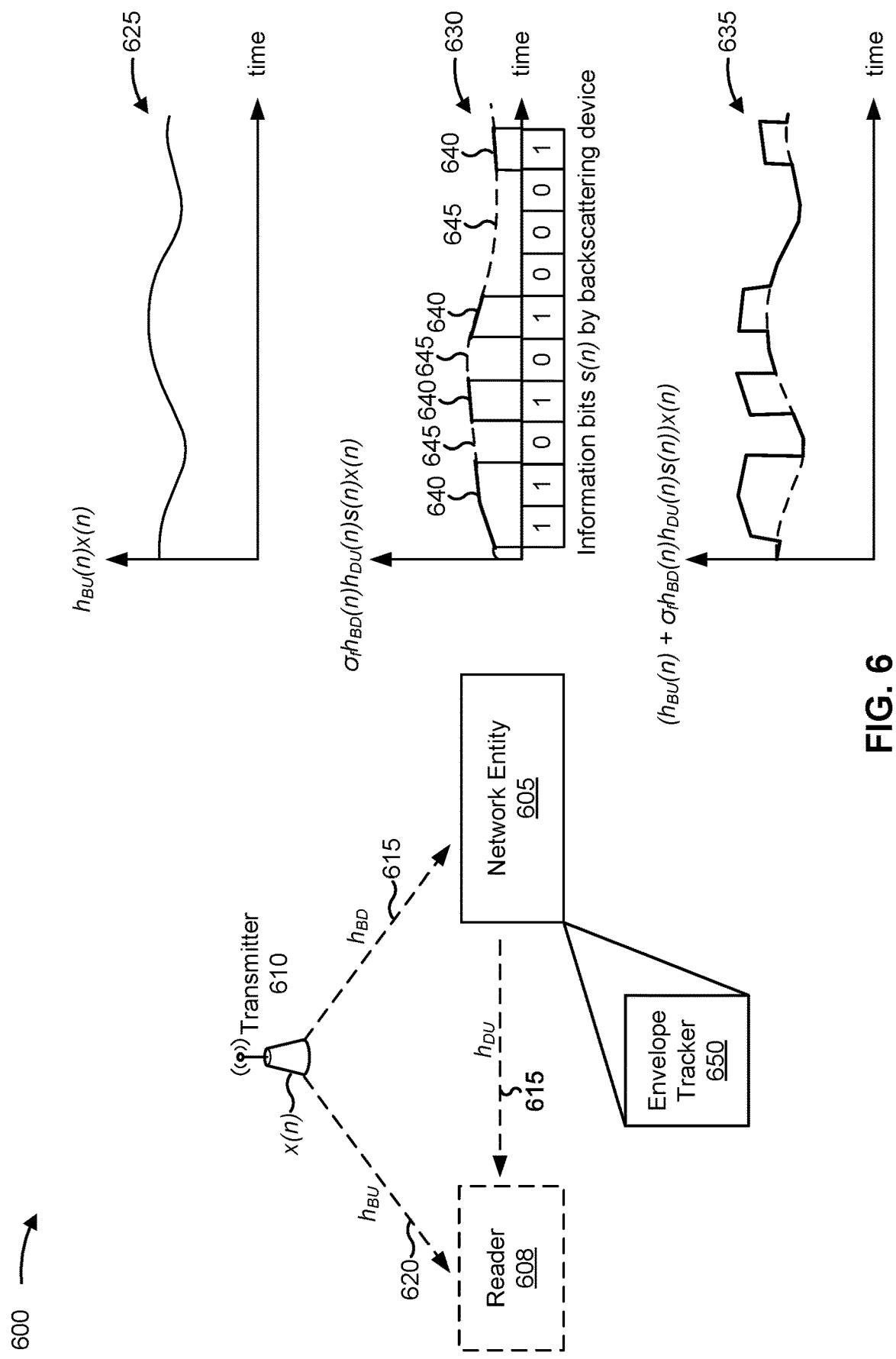
FIG. 6 is a diagram illustrating an example associated with backscatter communications, in accordance with the present disclosure.

FIG. 6 is a diagram illustrating an example 600 associated with backscatter communications, in accordance with the present disclosure.

Some network entities may be considered Internet of Things (IoT) devices, such as ambient IoT devices (sometimes referred to as ultra-light IoT devices), or similar IoT devices. IoT technology may include passive IoT (e.g., NR passive IoT for 5G Advanced), semi-passive IoT, ultra-light IoT, or ambient IoT, among other examples. In passive IoT, a terminal (e.g., an RFID device, a tag, or a similar device) may not include a battery, and the terminal may accumulate energy from RF signaling. Additionally, the terminal may accumulate solar energy to supplement accumulated energy from radio signaling. In passive IoT, a communication distance may be up to 30 meters (or more) to facilitate feasible network coverage over a large area (e.g., 5000 square meters), such as in a warehouse. Moreover, the power consumption of a passive IoT terminal may be less than 0.1 milliwatts (mW) to support operation without a battery, and the terminal may be relatively inexpensive to facilitate cost-sensitive uses. A positioning accuracy of a passive IoT terminal may be approximately 3-5 meters in the horizontal and the vertical directions.

Passive IoT may be useful in connection with industrial sensors, for which battery replacement may be prohibitively difficult or undesirable (e.g., for safety monitoring or fault detection in smart factories, infrastructures, or environments). Additionally, features of passive IoT devices, such as low cost, small size, maintenance-free, durable, long lifespan, or the like, may facilitate smart logistics/warehousing (e.g., in connection with automated asset management by replacing RFID tags). Furthermore, passive IoT may be useful in connection with smart home networks for household item management, wearable devices (e.g., wearable devices for medical monitoring for which patients do not need to replace batteries), and/or environment monitoring. To achieve further cost reduction and zero-power communication, 5G and/or 6G wireless networks may utilize a type of passive IoT device referred to as an "ambient backscatter device" or a "backscatter device."

A network entity 605 comprises a device (e.g., a tag, a sensor, a passive device such as a passive IoT device, a semi-passive device, an active device, a UE, or the like) that is powered, at least in part, by reception of an RF signal (e.g., from transmitter 610). In some examples, the network entity 605 may be the network entity 102, the network entity 104, the network entity 106, the apparatus 200, a UE 320, the network entity 402, and/or the network entity 404. In some examples, the network entity 605, may employ a simplified hardware design (e.g., including a power splitter, an energy harvester, and a microcontroller) that does not include a battery and/or an oscillator, such that network entity 605 uses energy harvesting for power, and that does not include a radio wave generation circuit, such that network entity 605 is capable of transmitting information only by reflecting a radio wave. In some examples, the network entity 605 may include a battery, a capacitor, or another form of energy storage. In some examples, the network entity 605 may include a communication module, such as a Bluetooth low energy (BLE) module, a WiFi module, or the like. The communication module may be powered, at least in part, by an RF signal transmitted by a transmitter 610, such that the network entity 605 can communicate with the transmitter 610 or another device using the communication module as powered by the RF signal. In some examples, the network entity 605 may include a radio wave generation circuit, which may be powered by reception of an RF signal and/or by energy storage of the network entity 605. The transmitter 610 may be the network entity 102, the network entity 104, the network entity 106, the apparatus 200, a UE 320, a network node 310, the network entity 402, and/or the network entity 404.

In some examples, the network entity 605 may communicate with a reader 608 (e.g., which may include a UE, a network node, a base station, or another network device) by modulating a reflecting radio signal from a transmitter 610, referred to herein as a transmitter (e.g., a network node, or another network device). In some examples, the transmitter 610 and the reader 608 may be the same device and/or may be co-located. In some examples, a transmitter may be referred to as an energizer. In some examples, the network entity 605 may not communicate with a reader 608. For example, the network entity 605 may communicate with another device (e.g., the transmitter 610, an RF energy harvesting device, or another network node). The reader 608 may be optional.

To facilitate communication of the network entity 605, the transmitter 610 may transmit an RF signal (e.g., an energy harvesting wave) to the network entity 605. When facilitating communication with the reader 608, the energy harvesting wave may be transmitted for a sufficient duration in order to enable a communication phase for a target range between the reader 608 and the network entity 605. Additionally, or alternatively, in some cases, a range between the transmitter 610 and the network entity 605 may be limited by a minimum received power for triggering energy harvesting at the network entity 605, such as −20 decibel milliwatts (dBm).

Once energy is sufficiently accumulated at the network entity 605, the network entity 605 may begin to communicate, or may store the energy. As one example, the network entity 605 may reflect the radio wave that is radiated onto the network entity 605 via a backscatter link 615. For example, the transmitter 610 may initiate a communication session (sometimes referred to as a query-response communication) with a query, which may be a modulating envelope of a continuous wave (CW). The network entity 605 may respond by backscattering of the CW. The communication session may include multiple rounds, such as for purposes of contention resolution when multiple backscatter devices respond to a query. A channel between the transmitter 610 and the network entity 605 of the backscatter link 615 may be associated with a first backscatter link channel response value (sometimes referred to as a first backscatter link channel coefficient or a first backscatter link gain value), $h_{BD}$. As described below, the network entity 605 may have reflection-on periods and reflection-off periods that follow a pattern that is based at least in part on the transmission of information bits by the network entity 605. The reader 608 may detect the reflection pattern of the network entity 605 and obtain the backscatter communication information via the backscatter link 615. A channel between the reader 608 and the network entity 605 of the backscatter link 615 may be associated with a second backscatter link channel response value (sometimes referred to as a second backscatter link channel coefficient or a second backscatter link channel gain value), $h_{DU}$. In addition, the transmitter 610 and the reader 608 may communicate (e.g., reference signals and/or data signals) via a direct link 620. A channel between the transmitter 610 and the reader 608 of the direct link 620 may be associated with a direct link channel response value (sometimes referred to as a direct link channel coefficient or a direct link channel gain value), $h_{BU}$. In some examples, the network entity 605 may use the received energy to power active transmission (e.g., using an amplifier) or other operations.

In some examples, the transmitter 610 may include a power source (e.g., a portable power source, such as a battery, or a hardwired power source). The transmitter 610 may include a transmit component, such as a radio frequency chain including a power amplifier and one or more antennas. In some examples, the one or more antennas may be capable of some degree of beamforming (whether based on a hardware configuration of the set of antennas, or via a dynamic beamforming approach such as analog beamforming or digital beamforming) such that an RF signal transmitted by the transmitter 610 is directed to a coverage area (e.g., an area such as a portion of a sphere, an azimuth, or the like) in which network entities 605 may be energized by the RF signal. In some examples, the transmitter 610 may include one or more sensors, such as an RF sensor, a light sensor, a motion sensor, or the like. In some examples, the transmitter 610 may be associated with (e.g., include, be connected to, be in communication with) a BLE module, which is a module capable of transmitting and/or receiving BLE signaling, such as BLE communications. In some examples, the BLE module may include an RF sensor. As shown, the transmitter 610 may include one or more processors, which may perform operations described herein, or be configured to perform operations described herein.

If performing backscattering communication, the network entity 605 may use an information modulation scheme, such as amplitude-shift keying (ASK) modulation, phase-shift keying (PSK) modulation, or on-off keying (OOK) modulation. For an information modulation scheme, the network entity 605 may switch on reflection when transmitting an information bit "1" and switch off reflection when transmitting an information bit "0." In backscatter communication, the transmitter 610 may transmit a particular radio wave (e.g., a reference signal or a data signal, such as a physical downlink shared channel (PDSCH)), which may be denoted as x(n). The reader 608 may receive this radio wave, x(n), directly from the transmitter 610 via the direct link 620, as well as from the network entity 605 modulating and reflecting the radio wave to the reader 608 via the backscatter link 615. The signal received at the reader 608 via the direct link 620, denoted as $h_{BU}(n)x(n)$ and indicated by reference number 625, is the product of the radio wave transmitted by the transmitter 610, x(n), multiplied by the direct link channel response value, $h_{BU}$, plus any signal noise. The information bits signal of the network entity 605 may be denoted as s(n) where $s(n) \in \{0,1\}$. Accordingly, the signal received at the reader 608 via the backscatter link 615, denoted as $\sigma_f h_{BD}(n)h_{DU}(n)s(n)x(n)$ and indicated by reference number 630, is the product of the signal transmitted by the transmitter 610, x(n), multiplied by the first backscatter link channel response value, $h_{BD}$, the second backscatter link channel response value, $h_{DU}$, the information bits signal from the network entity 605, s(n), and a reflection coefficient associated with the network entity 605, $\sigma_f$, plus any noise.

Thus, if performing backscattering communication, the resulting signal received at the reader 608, which is the superposition of the signal received via the direct link 620 and the signal received via the backscatter link 615, may be denoted as y(n) where $y(n)=(h_{BU}(n)+\sigma_f h_{BD}(n)h_{DU}(n)s(n))x(n)+noise$. This signal, y(n), is shown by reference number 635. As shown, when s(n)=0 (indicated by reference number 640 in the plot shown at reference number 630), the network entity 605 may switch off reflection, such that the signal component $\sigma_f h_{BD}(n)h_{DU}(n)s(n)$ equals zero, and thus the reader 608 receives only the direct link 620 signal (e.g., $y(n)=h_{BU}(n)x(n)+noise$). When s(n)=1 (indicated by reference number 645 in the plot shown at reference number 630), the network entity 605 may switch on reflection, such that signal component $\sigma_f h_{BD}(n)h_{DU}(n)s(n)$ equals $\sigma_f h_{BD}(n)h_{DU}(n)$, and thus the reader 608 receives a superposition of both the direct link 620 signal and the backscatter link 615 signal (e.g., $y(n)=(h_{BU}(n)+\sigma_f h_{BD}(n)h_{DU}(n))x(n)+noise$). To receive the information bits transmitted by the network entity 605, the reader 608 may first decode x(n) based at least in part on the direct link channel response value of $h_{BU}(n)$ by treating the backscatter link 615 signal as interference. The reader 608 may then detect the existence of the signal component $\sigma_f h_{BD}(n)h_{DU}(n)x(n)$ by subtracting $h_{BU}(n)x(n)$ from y(n). In some cases, the network entity 605 may not maintain a state from communication session to communication session except of what is stored in the network entity 605 memory, such as an electronic product code (EPC) associated with network entity 605 or similar information.

The network entity 605 may detect or decode the radio wave (e.g., a reference signal or a data signal, such as a PDSCH), x(n), that is transmitted by the transmitter 610. The network entity 605 may detect or decode radio wave via an envelope tracker 650. The envelope tracker 650 may be a component or module of the network entity 605 associated with decoding wireless signals via envelope tracking. As used herein, an "envelope" of a signal may refer to the amplitude or magnitude of the signal as amplitude or magnitude varies over time. The envelope may be a function of the modulation applied to the signal. The envelope may be represented as a waveform that captures the variations in amplitude of the signal over time. Where a modulation scheme is applied to a signal, the envelope of the signal varies in accordance with a modulating waveform. Envelope tracking can be used as a technique to detect and extract a modulated signal in wireless communications systems. For example, envelope tracking may be utilized by the network entity 605 as a form of signal demodulation that can recover a baseband signal from a modulated RF signal, as described in more detail elsewhere herein.

Some IoT devices may be referred to as semi-passive IoT devices, because communication between a reader and the IoT device does not need to be preceded by an energy harvesting waveform. For example, semi-passive IoT devices may include a battery or similar energy source that can power the receiver and/or logic circuit. For such devices, energy harvesting may still be triggered in some cases, such as for long-range communications. In such examples, a rectifier circuit of the IoT device may have a warm start from the battery or other energy source, and thus may be associated with a lower minimum received power requirement than passive IoT devices (e.g., −30 dBm rather than −20 dBm). Nonetheless, long-range communications may require battery power spend to energize each decoding. More particularly, for long-range communications in which an energy harvesting rate is lower than a decoding circuit requirement, such as when the energy harvesting rate is below −30 dBm, the semi-passive IoT device may expend battery power to energize each decoding. Thus, continuous IoT device monitoring, such as for purposes of receiving a long-distance query communication, may result in excessive battery drain at the IoT device.

In that regard, passive and semi-passive IoT devices may be inherently limited for certain applications. For example, passive IoT devices may be associated with a low cost and form factor because there is no need for an RF chain at the IoT device. However, these devices require an energy harvesting waveform, limiting the application of such passive IoT devices to short-distance communications. Although semi-passive IoT devices may eliminate the need for an energy harvesting waveform and/or may enable long-distance communications, such devices increase cost and complexity because the devices require the use of a battery or similar energy source. Moreover, because passive and semi-passive devices may be associated with a communication session that is initiated by the RF source, these devices may be inherently limited for use in sensing scenarios or similar latency-critical applications that require aperiodic traffic, and the devices may not scale well for use in high IoT density applications.

In some cases, an ambient IoT device (sometimes referred to as an ultra-light IoT device) may be employed in order to overcome some of the deficiencies of passive and semi-passive IoT devices. An ambient IoT device may be a device that is capable of transmitting an uplink trigger, and thus may initiate a communication session from the IoT device side. For example, an ambient IoT device may be associated with uplink transmissions that do not utilize a PA (e.g., a transmission in the range of 0 to 5 dBm), and for which there is limited transmission capability, such as an ability to simply transmit a preamble transmission to indicate uplink traffic. Ambient IoT devices, passive devices, and semi-passive devices are referred to herein as RF energy harvesting devices (though an RF energy harvesting device can include another form of device that is capable of harvesting RF energy from an RF signal to power operations of the device).

As indicated above, FIG. 6 is provided as an example. Other examples may differ from what is described with respect to FIG. 6.

Figure 7:
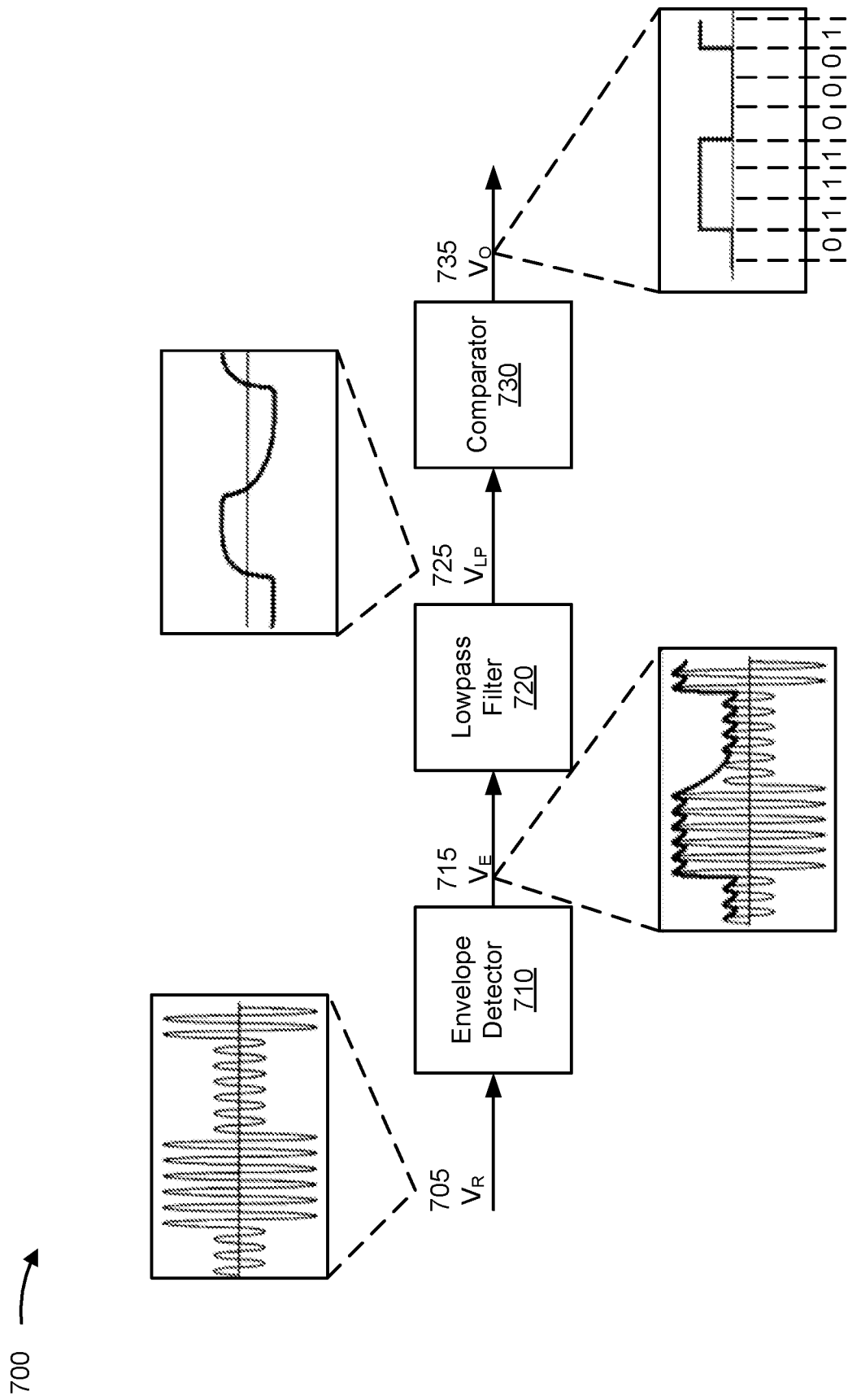
FIG. 7 is a diagram illustrating an example associated with envelope tracking, in accordance with the present disclosure.

FIG. 7 is a diagram illustrating an example 700 associated with envelope tracking, in accordance with the present disclosure. The operations described and depicted in connection with FIG. 7 may be performed by a network node, such as the network entity 605, the network entity 102, the network entity 104, the network entity 106, the apparatus 200, a UE 320, the network entity 402, and/or the network entity 404, among other examples. In some examples, the network entity may be a tag (e.g., an RFID tag), a sensor, a passive device, a passive IoT device, a semi-passive device, an active device, a RedCap network node, a low-tier network node, an NR-Lite network node, and/or a UE, among other examples, that is associated with reduced RF capabilities. For example, the network entity may not include active RF components, such as an oscillator, a power amplifier, a low noise amplifier, a mixer, and/or other RF components.

Envelope tracking may be used by the network entity to decode a wireless signals. For example, envelope tracking can be used as a technique to detect and extract a modulated signal. Envelope tracking may be utilized by the network entity as a form of signal demodulation that can recover a baseband signal from a modulated RF signal. For example, the network entity may receive a signal 705 having a received voltage (VR) over time. For example, an amplitude of the signal may vary over time, as shown in FIG. 7.

The network entity may provide the signal (or information associated with the signal) to an envelope detector 710 (e.g., that may be similar to the envelope tracker 650). The envelope detector 710 may be configured to detect an envelope 715 associated with the signal 705. In some examples, the envelope detector 710 may be configured to detect an upper envelope of the signal 705. The upper envelope may be a waveform indicating the upper extremes of the amplitude of the signal 705 over time. For example, the envelope of the signal 705 may be represented by the bold waveform shown in FIG. 7. The envelope 715 may be associated with an envelope voltage (VE) indicating a voltage of the envelope 715 over time.

The network entity may provide the envelope 715 and/or the envelope voltage (VE) to a lowpass filter 720. The lowpass filter 720 may be associated with filtering frequencies that are above a frequency threshold. For example, the lowpass filter 720 may allow signals with a lower frequency to pass through, while blocking signals with higher frequencies (e.g., above the frequency threshold). The network entity may provide the envelope 715 and/or the envelope voltage (VE) to the lowpass filter 720 to extract a baseband signal associated with the signal 705. The lowpass filter 720 removes high-frequency components of the signal 705, leaving only a filtered signal 725 at the output of the lowpass filter 720. The filtered signal 725 having a voltage (VLP) over time can then be further processed, as described herein.

For example, the network entity may provide the filtered signal 725 having a voltage (VLP) over time to a comparator 730. The comparator 730 may be a component configured to determine whether a voltage (Vo) of a signal at a given time is to be associated with a "1" or a "0" (e.g., for information bits of the signal 705). For example, the comparator 730 may compare a voltage of the filtered signal 725 to one or more thresholds. As an example, if a value of a voltage at a given time satisfies a threshold, the comparator 730 may determine that the filtered signal 725 is associated with a "1" at the given time. If a value of a voltage at a given time does not satisfy the threshold, the comparator 730 may determine that the filtered signal 725 is associated with a "0" at the given time. The comparator 730 may provide an output 735 with voltages (Vo) that are indicative of a "1" or a "0" for respective information bits of the signal 705.

As shown in FIG. 7, the network entity may decode the information bits (e.g., a series of "1" and/or "0") based on the output of the comparator 730. For example, for a time window (e.g., a given amount of time), the network entity may determine whether the output 735 of the comparator indicates a "0" or a "1". The network entity may determine that a bit (e.g., associated with the time window) is associated with a "0" or a "1" based on, in accordance with, or otherwise associated with the output 735 of the comparator 730. As a result, a decoding operation performed by the network entity may be simplified and/or associated with reduced complexity. For example, the network entity is enabled to obtain values of the information bits of the signal 705 without using one or more active RF components. Additionally, the network entity is enabled to obtain values of the information bits of the signal 705 without down-converting the signal 705 to a baseband signal. As another example, the envelope tracking decoding operation enables the network entity to obtain values of the information bits of the signal 705 without performing a carrier frequency offset and/or frequency synchronization.

However, in some cases, more than one transmitter may be transmitting a signal in a spatial direction toward the network entity at a given time. For example, a first transmitter may be transmitting a first signal ($s_1$) to the network node. The first signal may be a signal intended for the network node. Another transmitter may be transmitting a second signal ($s_2$) in a spatial direction toward the network node, such that the network entity receives the second signal. The second signal may or may not be intended for the network node. The first signal and the second signal may at least partially overlap in the time domain. For example, the second signal may interfere with the first signal, causing an amplitude of a received signal at the network entity to be different than an amplitude of the first signal. As a result, the second signal may impact or modify an envelope of the first signal, resulting in the network entity being unable to accurately decode the first signal using the envelope tracking decoding operation described herein.

For example, the first signal may be represented as $s_1(t)=a1(t)\cos(2\pi f_{d1}t)$, where $a_1(t)$ is data (e.g., an information bit) to be communicated at a time t for the first signal, and $f_{d1}$ is a frequency associated with the first signal. The second signal may be represented as $s_2(t)=a_2(t)\cos(2\pi f_{d_2}t)$, where $a_2(t)$ is data (e.g., an information bit) to be communicated at a time t for the second signal, and $f_{d_2}$ is a frequency associated with the second signal. The received signal at the network entity may be a summation of the first signal and the second signal, such as $r_1(t)=s_1(t)+s_2(t)=a_1(t)\cos(2\pi f_{d1}t)+a_2(t)\cos(2\pi f_{d_2}t)$. The envelope of the received signal may be associated with a squared value of the received signal. For example, the envelope of the received signal may be represented as $r_2^1=a_2^1(t)\cos^2(2\pi f_{d1}t)+a_2^2(t)\cos^2(2\pi f_{d_2})+2a_1(t)a_2(t)\cos(2\pi f_{d1}t)\cos(2\pi f_{d_2}t)$. After removing the higher frequency terms of the envelope (e.g., after performing lowpass filtering), a direct current (DC) voltage of the envelope may be represented as $a_1^2(t)+a_2^2(t)$ and a low-frequency term of the envelope may be represented as $a_1(t)a_2(t)\cos(2\pi f_{d_2}-f_{d1})t)$. Because the DC voltage (e.g., the DC term of the envelope) of the received signal is a sum of the data transmitted via the first signal and the second signal, the network entity may be unable to extract or recover the individual signals using envelope tracking (e.g., because the envelope includes terms that are a sum of the data transmitted via the first signal and the second signal). As a result, communication performance and/or decoding performance associated with the network entity may be degraded because the network entity may incorrectly decode a signal using envelope tracking when one or more other signals are received by the network entity at a time that at least partially overlaps with the time at which the signal is received by the network node.

As indicated above, FIG. 7 is provided as an example. Other examples may differ from what is described with respect to FIG. 7.

Figure 8:
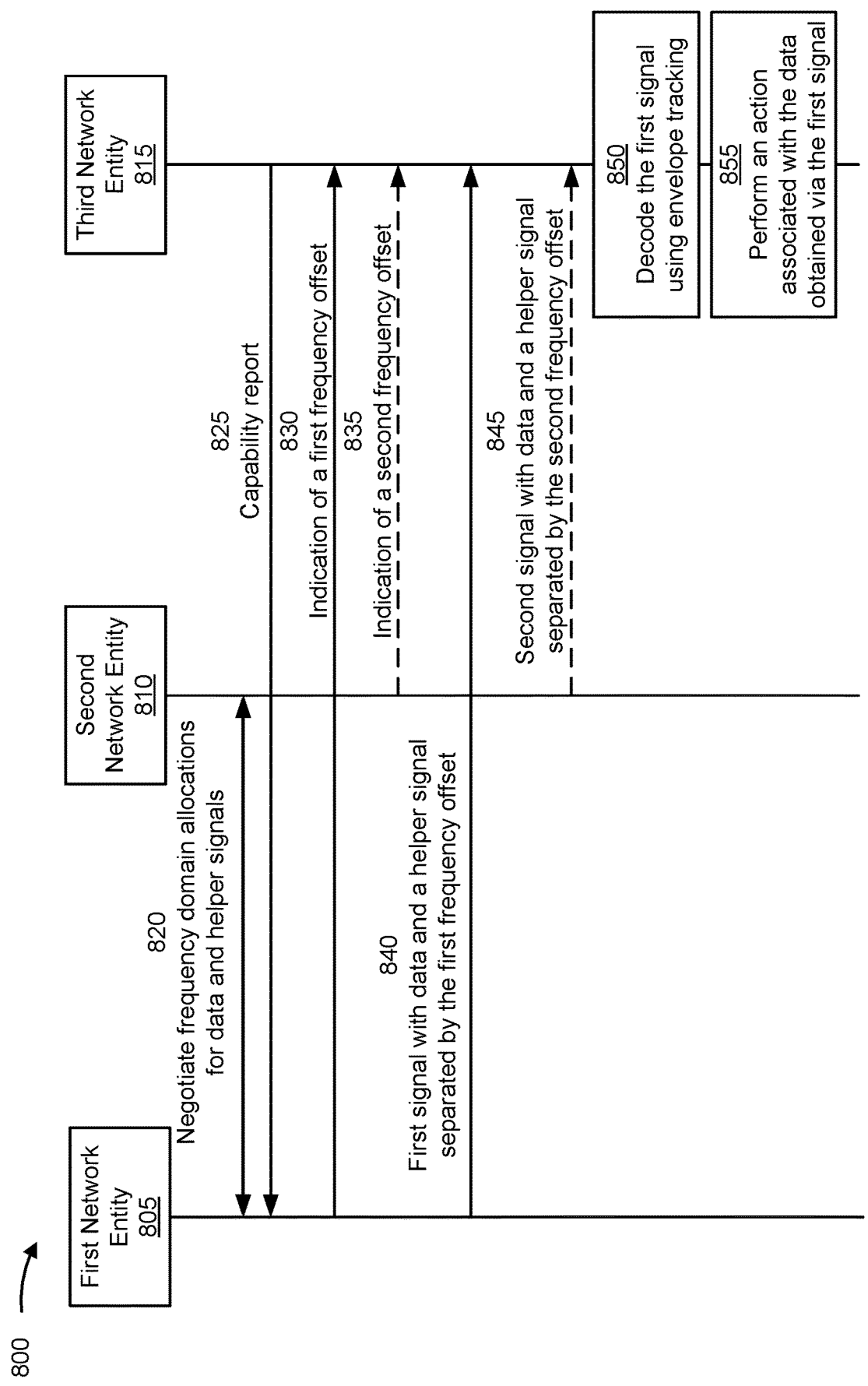
FIG. 8 is a diagram of an example associated with operations associated with helper signal based envelope tracking, in accordance with the present disclosure.

FIG. 8 is a diagram of an example associated with operations 800 associated with helper signal based envelope tracking, in accordance with the present disclosure. As shown in FIG. 8, a first network entity 805, a second network entity 810, and a third network entity 815 may communicate with each other. In some aspects, the first network entity 805, the second network entity 810, and the third network entity 815 may be part of a wireless network (for example, the wireless network 300). The first network entity 805 and/or the second network entity 810 may be the network entity 102, the network entity 104, the network entity 106, the apparatus 200, the network node 310, the UE 320, the network entity 402, the network entity 404, the transmitter 610, a base station, a CU, a DU, and/or an RU, among other examples. The third network entity 815 may be the network entity 102, the network entity 104, the network entity 106, the apparatus 200, the network node 310, the UE 320, the network entity 402, the network entity 404, the network entity 605, a tag (e.g., an RFID tag), a sensor, a passive device, a passive IoT device, a semi-passive device, a RedCap network node, a low-tier network node, and/an NR-Lite network node, among other examples.

As shown by reference number 820, the first network entity 805 and the second network entity 810 may negotiate frequency domain allocations for data and helper signals. In some aspects, the first network entity 805 and the second network entity 810 may negotiate frequency domain allocations for data and helper signals for communications that are intended for, or otherwise associated with, network nodes or devices performing envelope tracking decoding (e.g., in a similar manner as described in connection with FIG. 7), such as the third network entity 815. The communications (e.g., that include data and a helper signal) may be downlink data communications. In some aspects, the communications may be IoT communications (e.g., communicated via an IoT channel).

The first network entity 805 and the second network entity 810 may communicate one or more signals or information to determine the first frequency offset, the first frequency domain position, the second frequency offset, and/or the second frequency domain position, among other examples. For example, the first network entity 805 may transmit, and the second network entity 810 may receive, information associated with negotiating the first frequency offset, the first frequency domain position, the second frequency offset, and/or the second frequency domain position, among other examples. Additionally, or alternatively, the second network entity 810 may transmit, and the first network entity 805 may receive, information associated with negotiating the first frequency offset, the first frequency domain position, the second frequency offset, and/or the second frequency domain position, among other examples.

In some other aspects, another network entity (not shown in FIG. 8), such as a control entity or a CU, may determine the frequency domain allocations for data and helper signals (e.g., in a similar manner as described herein). In such examples, the other network entity may transmit, and the first network entity 805 and the second network entity 810 may receive, an indication of the frequency domain allocations for data and helper signals.

In some aspects, the first network entity 805 and/or the second network entity 810 may determine the frequency domain allocations for data and helper signals in accordance with one or more conditions. The one or more conditions may be associated with mitigating interference (e.g., between communications transmitted via different network nodes, such as the first network entity 805 and the second network entity 810). For example, the one or more conditions may ensure that the third network entity 815 is able to isolate the intended signals from interference caused by the first network entity 805 and the second network entity 810 transmitted at the same time (e.g., in a spatial direction toward the third network entity 815), as described in more detail elsewhere herein. In some aspects, the one or more conditions may be associated with a bandwidth of a channel used to transmit the communications (e.g., an IoT channel or an ambient-IoT channel). For example, a conditioned may be defined with respect to the bandwidth of the channel. In some aspects, the bandwidth of the channel may be a bandwidth (or bandwidth part) associated with the communications.

In some aspects, the one or more conditions may be associated with an amount or quantity of frequency domain resources between frequency domain locations associated with data transmitted by the first network entity 805 and the second network entity 810. For example, a condition may be $f_{d_2} > f_{d_1} + \Delta f_1 + \Delta f_2 + \Delta d$, where $f_{d_2}$ is a frequency domain location of data to be transmitted by the second network entity 810, $f_{d_1}$ is a frequency domain location of data to be transmitted by the first network entity 805. $\Delta f_1$ is a frequency offset (e.g., between data and a helper signal) associated with the first network entity 805. $\Delta f_2$ is a frequency offset (e.g., between data and a helper signal) associated with the second network entity 810, and $\Delta d$ is a bandwidth of the channel (e.g., an IoT channel) or a bandwidth of the data being communicated. More generally, for m network nodes transmitting via the channel, the condition may be $f_{dm} > f_{dm-1} + \Delta f_{m-1} + \Delta f_m + \Delta d$.

Additionally, or alternatively, a condition may be defined for determining values of respective frequency offsets for network nodes transmitting via the channel (e.g., via the IoT channel). For example, the condition for a given network entity may be based on, or otherwise associated with, the bandwidth of the channel and a frequency offset of another network node. As an example, the condition may be $\Delta f_2 > \Delta f_1 + \Delta d$. More generally, for m network nodes transmitting via the channel, the condition may be $\Delta f_m > \Delta f_m - 1 + \Delta d$. The conditions described herein may ensure that interference generated as a result of transmissions (e.g., that include data and helper signals) from respective network nodes via the channel occur in frequency domain locations that do not overlap (e.g., in the frequency domain) with the data and/or that enable the third network entity 815 to filter out or otherwise remove the interference (e.g., via a lowpass filter).

The communications (e.g., that include data and a helper signal) may be communicated via a channel, such as an IoT channel. An IoT channel may be a channel associated with communications between devices in an IoT network.

In some aspects, the first network entity 805 and the second network entity 810 may exchange communications indicating respective frequency domain allocations for data and helper signals. For example, the first network entity 805 and the second network entity 810 may communicate to negotiate a first frequency offset ($\Delta f_1$) and a first frequency domain position ($f_{d_1}$) for communications associated with the first network entity 805, and a second frequency offset ($\Delta f_2$) and a second frequency domain position ($f_{d_2}$) for communications associated with the second network entity 810. For example, the first frequency offset may be an offset (e.g., in the frequency domain) between data (e.g., transmitted at the first frequency domain position) and a helper signal transmitted by the first network entity 805. The second frequency offset may be an offset (e.g., in the frequency domain) between data (e.g., transmitted at the second frequency domain position) and a helper signal transmitted by the second network entity 810.

As an example, the first network entity 805 may transmit, and the second network entity 810 may receive, an indication of the first frequency offset ($\Delta f_1$) and the first frequency domain position ($f_{d_1}$). In some aspects, the first network entity 805 may determine a value of the first frequency offset ($\Delta f_1$) based on, or otherwise associated with, the bandwidth of the channel. For example, the first network entity 805 may determine a value of the first frequency offset ($\Delta f_1$) to be greater than or equal to the bandwidth of the channel. The second network entity 810 may determine the second frequency offset ($\Delta f_2$) and the second frequency domain position ($f_{d_2}$) based on, in accordance with, or otherwise associated with the one or more conditions. For example, the second network entity 810 may calculate the second frequency offset ($\Delta f_2$) and the second frequency domain position ($f_{d_2}$) based on, or otherwise associated with, the first frequency offset ($\Delta f_1$), the first frequency domain position ($f_{d_1}$) and the one or more conditions. The second network entity 810 may transmit, and the first network entity 805 may receive, an indication of the second frequency offset ($\Delta f_2$) and the second frequency domain position ($f_{d_2}$).

In other aspects, another network entity (e.g., a CU) may transmit, and the first network entity 805 may receive, an indication of the first frequency offset ($\Delta f_1$) and the first frequency domain position ($f_{d_1}$). The other network entity may transmit, and the second network entity 810 may receive, an indication of the second frequency offset ($\Delta f_2$) and the second frequency domain position ($f_{d_2}$). In such examples, the other network entity may determine the frequency offsets and the frequency domain positions in a similar manner as described herein.

As an example, the bandwidth of the channel may be 180 kilohertz (KHz). The first network entity 805 may determine that the first frequency offset is 180 KHz. The second network entity 810 may determine that the second frequency offset is a value greater than 360 KHz (e.g., $\Delta f_2 > 180$ KHz+180 KHz). Additionally, the second network entity 810 may determine that the second frequency domain position is a value that satisfies $f_{d_2} > f_{d_1} + 180$ KHz+360 KHz+180 KHz, assuming that the second frequency offset is 360 KHz.

In some aspects, the first network entity 805 and/or the second network entity 810 may determine or select a value of the first frequency offset ($\Delta f_1$) and the second frequency offset ($\Delta f_2$) based on, in accordance with, or otherwise associated with a capability of the third network entity 815. For example, as described in more detail elsewhere herein, the third network entity 815 may transmit a capability report indicating one or more supported values for frequency offsets used by other network nodes. The first network entity 805 and/or the second network entity 810 may determine or select a value of the first frequency offset ($\Delta f_1$) and the second frequency offset ($\Delta f_2$) from the one or more supported values for frequency offsets indicated by the third network entity 815.

In some aspects, the first network entity 805 and/or the second network entity 810 may determine or select a value of the first frequency offset ($\Delta f_1$) and the second frequency offset ($\Delta f_2$) based on, in accordance with, or otherwise associated with a size or bandwidth of a downlink data channel, such as a PDSCH. For example, a bandwidth of the PDSCH may be H resource blocks (RBs). The first network entity 805 and/or the second network entity 810 may determine or select a value of the first frequency offset ($\Delta f_1$) and the second frequency offset ($\Delta f_2$) to be greater than or equal to H RBs. This may enable the third network entity 815 to mitigate interference caused by transmissions via the PDSCH.

As shown by reference number 825, the third network entity 815 may transmit, and the first network entity 805 (and/or the second network entity 810) may receive, a capability report. The third network entity 815 may transmit the capability report via capability signaling, a UE assistance information (UAI) communication, an RRC communication, a physical uplink shared channel (PUSCH), and/or a physical uplink control channel (PUCCH), among other examples. The capability report may indicate support for one or more operations described herein. For example, the capability report may indicate whether the third network entity 815 supports envelope tracking-based decoding for modulated signals (e.g., envelope tracking as described in connection with FIG. 7). The capability report may indicate whether the third network entity 815 supports helper signal (or helper tone) based envelope tracking decoding, as described in more detail elsewhere herein. In some aspects, the capability report may indicate one or more frequency offsets that are supported by the third network entity 815. For example, the capability report may indicate one or more supported values for frequency offsets associated with helper signal (or helper tone) based envelope tracking decoding, as described in more detail elsewhere herein.

The first network entity 805 and/or the second network entity 810 (or another network node) may configure the third network entity 815 in accordance with the capability report. For example, the first network entity 805 may configure, or may trigger, the third network entity 815 to perform one or more operations based on, in response to, or otherwise associated with the capability report indicating that the third network entity 815 supports the one or more operations. As an example, the first network entity 805 may configure, or may trigger, the third network entity 815 to perform helper signal-based envelope tracking decoding based on, in response to, or otherwise associated with the capability report indicating that the third network entity 815 supports helper signal-based envelope tracking decoding. As another example, the first network entity 805 may determine or select a value of a frequency offset to be used by the first network entity 805 based on, in response to, or otherwise associated with the capability report indicating that the third network entity 815 supports the value of the frequency offset for helper signal-based envelope tracking decoding.

As shown by reference number 830, the first network entity 805 may transmit, and the third network entity 815 may receive, an indication of a frequency offset associated with transmissions from the first network entity 805 (e.g., an indication of the value of the first frequency offset ($\Delta f_1$)). For example, the first frequency offset may be used by the first network entity 805 for transmission or signals to be transmitted by the first network entity 805 (e.g., a signal to be transmitted by the first network entity 805 may include a communication and a helper signal separated in the frequency domain based on the first frequency offset). In some aspects, the indication of the first frequency offset may be first information and the first frequency offset may be second information. For example, the first information may be a first value and the second information may be a second value, where the first value is indicative of the second value. As another example, the indication of the first frequency offset may include information indicative of a value of the first frequency offset. As another example, the indication of the first frequency offset may include the value of the first frequency offset. For example, the first network entity 805 may transmit, and the third network entity 815 may receive, an indication of a quantity of frequency domain resources (e.g., in units of KHz or RBs) between data and a helper signal transmitted by the first network entity 805 (e.g., via an IoT channel). The frequency offset may indicate that the first network entity 805 is to transmit signals or transmissions that include a communication (e.g., a data communication or a control communication) and a helper signal that are separated in a frequency domain by the frequency offset.

The first network entity 805 may transmit, and the third network entity 815 may receive, the indication of the first frequency offset via configuration information. In some aspects, the indication of the frequency offset may be included in a broadcast communication. For example, the first network entity 805 may broadcast information indicating a value of the first frequency offset to be used by the first network entity 805. In some aspects, the indication of the first frequency offset may be included in a system information communication (e.g., in a system information block (SIB) or a master information block (MIB)). As another example, the indication of the first frequency offset may be included in another communication, such as an RRC communication. In some aspects, the indication of the first frequency offset may be included in a broadcast communication.

The third network entity 815 may receive and decode the communication indicating the frequency offset ($\Delta f_1$) associated with the first network entity 805. The third network entity 815 may configure itself based on, or otherwise associated with, the frequency offset ($\Delta f_1$) associated with the first network entity 805. For example, the third network entity 815 may configure a decoder or a decoding component of the third network entity 815 with the value of the frequency offset ($\Delta f_1$) to enable the third network entity 815 to decode transmissions or signals from the first network entity 805, as described in more detail elsewhere herein.

In some aspects, as shown by reference number 835, the second network entity 810 may transmit, and the third network entity 815 may receive, an indication of a second frequency offset associated with transmissions from the second network entity 810 (e.g., an indication of the value of the second frequency offset ($\Delta f_2$)). For example, the second frequency offset may be used by the second network entity 810 for signals transmitted by the second network entity 810 (e.g., a signal to be transmitted by the second network entity 810 may include a communication and a helper signal separated in the frequency domain based on the second frequency offset). In some aspects, the indication of the second frequency offset may be first information and the first frequency offset may be second information. For example, the first information may be a first value and the second information may be a second value, where the first value is indicative of the second value. As another example, the indication of the second frequency offset may include information indicative of a value of the second frequency offset. As another example, the indication of the second frequency offset may include the value of the second frequency offset. The second network entity 810 may transmit the indication of the second frequency offset in a similar manner as described in connection with the first network entity 805. For example, the third network entity 815 may receive indications of respective frequency offsets for transmitters (e.g., the first network entity 805 and the second network entity 810) in a geographic region around or near the third network entity 815. This enables the third network entity 815 to isolate a signal transmitted by a particular network entity (e.g., by performing envelope tracking decoding using the frequency offset associated with the particular network node) when multiple network nodes are transmitting at the same time (e.g., at times that at least partially overlap in the time domain) in the geographic region around or near the third network entity 815.

As described elsewhere herein, the helper signal may be a single tone. A tone may also be referred to as a subcarrier or a resource element (RE). For example, time-frequency resources in a radio access network may be partitioned into resource blocks (RBs). An RB may include a set of subcarriers (e.g., 12 subcarriers) and a set of symbols (e.g., 14 symbols). In some aspects, an RB may include a set of subcarriers in a single slot. A single time-frequency resource included in an RB may be referred to as an RE. An RE may include a single subcarrier (e.g., in frequency) and a single symbol (e.g., in time). A symbol may be referred to as an OFDM symbol. An RE may be used to transmit one modulated symbol, which may be a real value or a complex value. The helper signal may occupy a single tone (e.g., a single subcarrier) and may have a fixed or known value or amplitude. In some aspects, the helper signal may be, or may occupy, a single RE. In some aspects, the helper signal may be associated with a fixed frequency.

As shown by reference number 840, the first network entity 805 may transmit, and the third network entity 815 may receive, a first signal that includes data and a helper signal separated based on, or otherwise associated with, the first frequency offset (e.g., separated by the first frequency offset or separated by a frequency value that is based on, or otherwise associated with, the first frequency offset). The first signal may be a modulated signal. For example, the first network entity 805 may modulate the first signal using ASK modulation, PSK modulation, or OOK modulation, among other examples. For example, a transmission from the first network entity 805 may include a communication (e.g., a data communication or a control communication) and a helper signal. The communication and the helper signal may be separated in the frequency domain by the first frequency offset ($\Delta f_1$). The communication may occupy one or more subcarriers and/or REs. The first network entity 805 may transmit the first signal (e.g., a modulated signal that includes the communication and the helper signal) via a channel associated with IoT (e.g., an IoT channel).

For example, the first signal transmitted by the first network entity 805 may be represented as $s_1(t)=a_1(t)\cos(2\pi f_{d1}t)+a_{h_1}\cos(2f_{h_1}t)$, where $a_1(t)$ is a value of information (e.g., an information bit) of the communication at a time t for the first signal, $f_{d1}$ is a frequency associated with the communication, $a_n$ is a value of the helper signal (e.g., a known or fixed value, such as "1"), and $f_{h_1}$ is a frequency associated with the helper signal. In some aspects, $f_{d1}$ may be a center frequency associated with the communication (e.g., where the communication occupies multiple frequency domain resources). As described elsewhere herein, a difference between the frequency associated with the communication and the frequency associated with the helper signal may be the first frequency offset (e.g., $\Delta f_1=f_{h_1}-f_{d1}$).

In some aspects, as shown by reference number 845, the second network entity 810 may transmit, and the third network entity 815 may receive, a second signal that includes data and a helper signal separated based on, or otherwise associated with, the second frequency offset (e.g., separated by the second frequency offset or separated by a frequency value that is based on, or otherwise associated with, the second frequency offset). In some aspects, the second signal may be intended for the third network entity 815 (e.g., that second network entity 810 may transmit the second signal to the third network entity 815). In other aspects, the second signal may not be intended for the third network entity 815. For example, the second network entity 810 may transmit the second signal to another network node, but the second signal may be transmitted in a spatial direction toward the third network entity 815, such as the third network entity 815 receives the second signal. The first signal and the second signal may at least partially overlap in the time domain. For example, the first network entity 805 may transmit the first signal and the second network entity 810 may transmit the second signal at the same time.

The second signal may be a modulated signal (e.g., modulated via ASK modulation, PSK modulation, or OOK modulation). For example, a transmission from the second network entity 810 may include a communication (e.g., a data communication or a control communication) and a helper signal. The communication and the helper signal may be separated in the frequency domain by the second frequency offset ($\Delta f_2$). The communication may occupy one or more subcarriers and/or REs. The second network entity 810 may transmit the second signal (e.g., a modulated signal that includes the communication and the helper signal) via a channel associated with IoT (e.g., an IoT channel). The IoT channel may be a different channel than the channel used to transmit the first signal.

For example, the second signal transmitted by the second network entity 810 may be represented as $s_2(t)=a_2(t)\cos(2\pi f_{d_2}t)+a_{h_2}\cos(2f_{h_2}t)$, where $a_2(t)$ is a value of information (e.g., an information bit) of the communication at a time t for the second signal, $f_{d_2}$ is a frequency associated with the communication, $a_n$ is a value of the helper signal (e.g., a known or fixed value, such as "1"), and $f_{h_2}$ is a frequency associated with the helper signal. In some aspects, $f_{d_2}$ may be a center frequency associated with the communication (e.g., where the communication occupies multiple frequency domain resources). As described elsewhere herein, a difference between the frequency associated with the communication and the frequency associated with the helper signal may be the second frequency offset (e.g., $\Delta f_2=f_{h_2}-f_{d_2}$).

As shown by reference number 850, the third network entity 815 may decode the first signal using envelope tracking. For example, the third network entity 815 may determine that the first signal is intended for the third network entity 815. As an example, the first network entity 805 may transmit, and the third network entity 815 may receive, scheduling information indicating that the first signal is to be transmitted to the third network entity 815. In some aspects, the third network entity 815 may be configured (e.g., by the first network entity 805 or another network node) with information indicating that the third network entity 815 is to receive communications from the first network entity 805 (e.g., the third network entity 815 may be configured to always decode communications from the first network entity 805).

The third network entity 815 may decode the first signal based on, in accordance with, or otherwise associated with the first frequency offset ($\Delta f_1$). For example, the third network entity 815 may, via envelope tracking, decode the transmission (e.g., the first signal) to obtain the communication (e.g., the data communication or the control communication). In some aspects, the third network entity may decode the first signal in association with the first frequency offset between the communication and the helper signal. For example, the third network entity 815 may detect an envelope of the first signal (e.g., may detect or determine an amplitude of the first signal over time). For example, the envelope of the first signal may be a square of the first signal as received by the third network entity 815. The envelope of the first signal may be represented as $a_1^2 + a_{h_1}^2$, $+2a_1(t)a_{h_1} \cos(2\pi\Delta f_1 t)$. Because the value of the first frequency offset is determined or selected in accordance with the one or more conditions described elsewhere herein, a value of the first frequency offset may be greater than a frequency span of $a_1^2$. In other words, a frequency domain locations of $a_1^2$ and $2a_1(t)a_{h_1} \cos(2\pi\Delta f_1 t)$ may not overlap in the frequency domain. Therefore, the third network entity 815 may be enabled to isolate the information or values in the envelope associated with $2a_1(t)a_{h_1} \cos(2\pi\Delta f_1 t)$.

For example, the third network entity 815 may perform, based on the first frequency offset, an operation associated with frequency domain resources of the first signal. In some aspects, the third network entity 815 may shift frequency domain resources of the transmission by a value of the first frequency offset. For example, the third network entity 815 may shift the detected envelope in the frequency domain by the first frequency offset ($\Delta f_1$). As another example, the third network entity 815 may apply a bandpass filter to isolate the information or values in the envelope associated with $2a_1(t)a_{h_1} \cos(2\pi\Delta f_1 t)$, where the bandpass filter is configured to filter out information or values outside of a given frequency range (e.g., where the given frequency range is based on, or otherwise associated with, the first frequency offset ($\Delta f_1$) and the frequency associated with the communication ($f_{d_1}$)).

As a result, the modified envelope of the first signal may indicate information associated with $2a_1(t)a_{h_1} \cos(2\pi\Delta f_1 t)$ (e.g., after passing the envelope through a lowpass filter to filter out high frequency terms). Because a value of an, is fixed or known and a value of $\Delta f_1$ is indicated to the third network entity 815, the third network entity 815 may be enabled to obtain the communication ($a_1(t)$) via envelope tracking. For example, the third network entity 815 may compare a voltage of the modified envelope (e.g., after passing the modified envelope through a lowpass filter) to one or more thresholds. As an example, if a value of a voltage at a given time satisfies a threshold, then the third network entity 815 may determine that the communication ($a_1(t)$) is associated with a "1" at the given time t. If a value of a voltage at a given time does not satisfy the threshold, then the third network entity 815 may determine that the communication ($a_1(t)$) is associated with a "0" at the given time.

The helper signal may facilitate the third network entity 815 isolating the first signal (e.g., the $2a_1(t)a_{h_1} \cos(2\pi\Delta f_1 t)$ term) when there are multiple signals that at least partially overlap in time. For example, assuming the multiple signals are the first signal (e.g., transmitted by the first network entity 805) and the second signal (e.g., transmitted by the second network entity 810), then the envelope of the received signal at the third network entity 815 may be $a_1^2(t) + a_2^2(t) + a_{h_1}^2 + a_{h_2}^2 + 2a_1(t)a_{h_1} \cos(2\pi\Delta f_1 t) + 2a_2(t)a_{h_2} \cos(2\pi\Delta f_2 t) + 2a_1(t)a_{h_2} \cos(2\pi(f_{h_2}-f_{d_2})t) + 2a_2(t)a_{h_1} \cos(2\pi(f_{h_1}-f_{d_2})) + 2a_1(t)a_2(t)\cos(2\pi(f_{d_2}-f_{d_1})t) + 2a_{h_1}a_{h_2} \cos(2\pi(f_{h_2}-f_{d_1})t)$, where $a_1^2(t) + a_2^2(t) + a_{h_1}^2 + a_{h_2}^2$ is a DC term (e.g., that would have otherwise been used by the third network entity 815 to perform envelope tracking for the received signal), $2a_1(t)a_{h_1} \cos(2\pi\Delta f_1 t)$ is a term to be used to decode the first signal via envelope tracking, $2a_2(t)a_{h_2} \cos(2\pi\Delta f_2 t)$ is a term to be used to decode the second signal via envelope tracking, and $2a_1(t)a_{h_2} \cos(2\pi(f_{h_2}-f_{d_1})t) + 2a_2(t)a_{h_1} \cos(2\pi(f_{h_1}-f_{d_2})t) + 2a_1(t)a_2(t)\cos(2\pi(f_{d_2}-f_{d_1})t) + 2a_{h_1}a_{h_2} \cos(2\pi f_{h_2}-f_{d_1})t)$ represents interference generated as a result of the first signal and the second signal being transmitted at times that at least partially overlap. By the first network entity 805 and the second network entity 810 determining or selecting the values of the frequency offsets and the frequency domain locations of the communications (e.g., values of $\Delta f_1$, $\Delta f_2$, $f_{d_1}$, and $f_{d_2}$) in accordance with the one or more conditions described herein, each term described above may be separated in the frequency domain (e.g., may not overlap in the frequency domain), such that the third network entity 815 is enabled to isolate and/or filter out other terms in the received signal.

For example, to decode the first signal, the third network entity 815 may modify the envelope of the received signal based on, in accordance with, or otherwise associated with the first frequency offset $\Delta f_1$ to isolate the term $2a_1(t)a_{h_1} \cos(2\pi\Delta f_1 t)$ (e.g., the third network entity 815 may shift the envelope by a value of the first frequency offset $\Delta f_1$). The third network entity 815 may then decode and obtain the communication $a_1(t)$ by performing envelope tracking, as described in more detail elsewhere herein. As another example, to decode the second signal, the third network entity 815 may modify the envelope of the received signal based on, in accordance with, or otherwise associated with the second frequency offset $\Delta f_2$ to isolate the term $2a_2(t)a_{h_1} \cos(2\pi\Delta f_2 t)$ (e.g., the third network entity 815 may shift the envelope by a value of the second frequency offset $\Delta f_2$). The third network entity 815 may then decode and obtain the communication $a_2(t)$ by performing envelope tracking, as described in more detail elsewhere herein. Because the frequency offsets and the frequency domain locations of the communications (e.g., values of $\Delta f_1$, $\Delta f_2$, $f_{d_1}$, and $f_{d_2}$) are determined or selected in accordance with the one or more conditions described herein, the generated interference may be at frequency domain locations that can be filtered out via a lowpass filter (e.g., may occur at frequency domain locations that do not overlap with $2a_1(t)a_{h_1} \cos(2\pi\Delta f_1 t)$ or $2a_2(t)a_{h_1} \cos(2\pi\Delta f_2 t)$). In other words, the generated interference may occur at frequency domain locations that are separated from the term $2a_1(t)a_{h_1} \cos(2\pi\Delta f_1 t)$ and the term $2a_2(t)a_{h_1} \cos(2\pi\Delta f_2 t)$ by a bandwidth of a channel (e.g., an IoT channel), $\Delta d$. This enables the third network entity 815 to filter out the interference and the summation of the two signals (e.g., $a_1^2(t) + a_2^2(t) + a_{h_1}^2 + a_{h_2}^2$) to isolate an intended communication for decoding.

As shown by reference number 855, the third network entity 815 may perform an action associated with the data or information obtained via the first signal. For example, the third network entity 815 decode the first signal and obtain information (e.g., one or more information bits) associated with the communication transmitted by the first network entity 805. The third network entity 815 may use an information modulation scheme, such as ASK modulation, PSK modulation, or OOK modulation, to reflect and/or forward the communication to another network entity (e.g., not shown in FIG. 8), in a similar manner as described in connection with FIG. 6. As another example, the third network entity 815 may store the data or information obtained via the first signal. As another example, the third network entity 815 may configure itself to perform one or more operations or actions in accordance with the data or information obtained via the first signal.

As indicated above, FIG. 8 is provided as an example. Other examples may differ from what is described with respect to FIG. 8.

Figure 9:
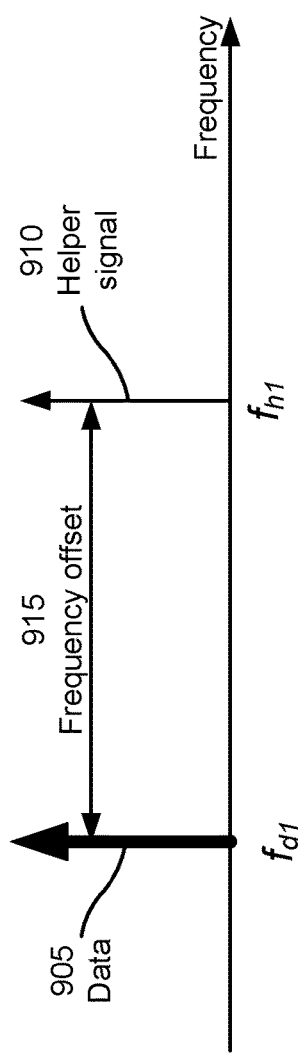
FIG. 9 is a diagram of an example associated with a transmission that includes a communication and a helper signal, in accordance with the present disclosure.

FIG. 9 is a diagram of an example associated with a transmission 900 that includes a communication and a helper signal, in accordance with the present disclosure. As shown in FIG. 9, the transmission 900 may include data 905 and a helper signal 910.

The data 905 may be associated with a data communication or a control communication. The data 905 may be associated with an IoT communication. For example, the transmission 900 may be transmitted via an IoT channel. The transmission 900 may be similar to the first signal and/or the second signal described above in connection with FIG. 8. The data 905 may occupy one or more frequency domain resources (e.g., one or more subcarriers or REs). The data 905 may be associated with a frequency location $f_{d_1}$. The frequency location $f_{d_1}$ may be a center frequency of the one or more frequency domain resource associated with the data 905. The helper signal 910 may be a single tone, a single subcarrier, and/or a single RE in the frequency domain. The helper signal 910 may not be associated with conveying information. For example, the helper signal 910 may be a tone having a fixed value or a fixed amplitude. The helper signal 910 may be associated with causing terms of a received signal (e.g., of an envelope of the received signal) to be sufficiently separated in the frequency domain (e.g., at a receiver, such as the third network entity 815) to enable the receiver to isolate the information (e.g., indicated by the envelope) associated with the data 905 when there are multiple transmissions occurring at the same, or partially overlapping, time.

As shown in FIG. 6, the data 905 and the helper signal 910 may be separated in the frequency domain by a frequency offset 915. For example, the helper signal 910 may be associated with a frequency $f_{h_1}$. A difference between $f_{d_1}$ and $f_{h_1}$, may be the frequency offset 915. A value of the frequency offset 915 may be selected and/or determined by a network entity that transmits the transmission 900. For example, as described in more detail elsewhere herein, the network entity may determine and/or negotiate the value of the frequency offset 915 based on, in accordance with, or otherwise associated with one or more conditions. The one or more conditions may ensure that the value of the frequency offset 915 is sufficient to cause terms of a received signal (e.g., of an envelope of the received signal) to be separated in the frequency domain (e.g., at a receiver, such as the third network entity 815) to enable the receiver to isolate the information (e.g., indicated by the envelope) associated with the data 905 when there are multiple transmissions occurring at the same, or partially overlapping, time.

As indicated above, FIG. 9 is provided as an example. Other examples may differ from what is described with respect to FIG. 9.

Figure 10:
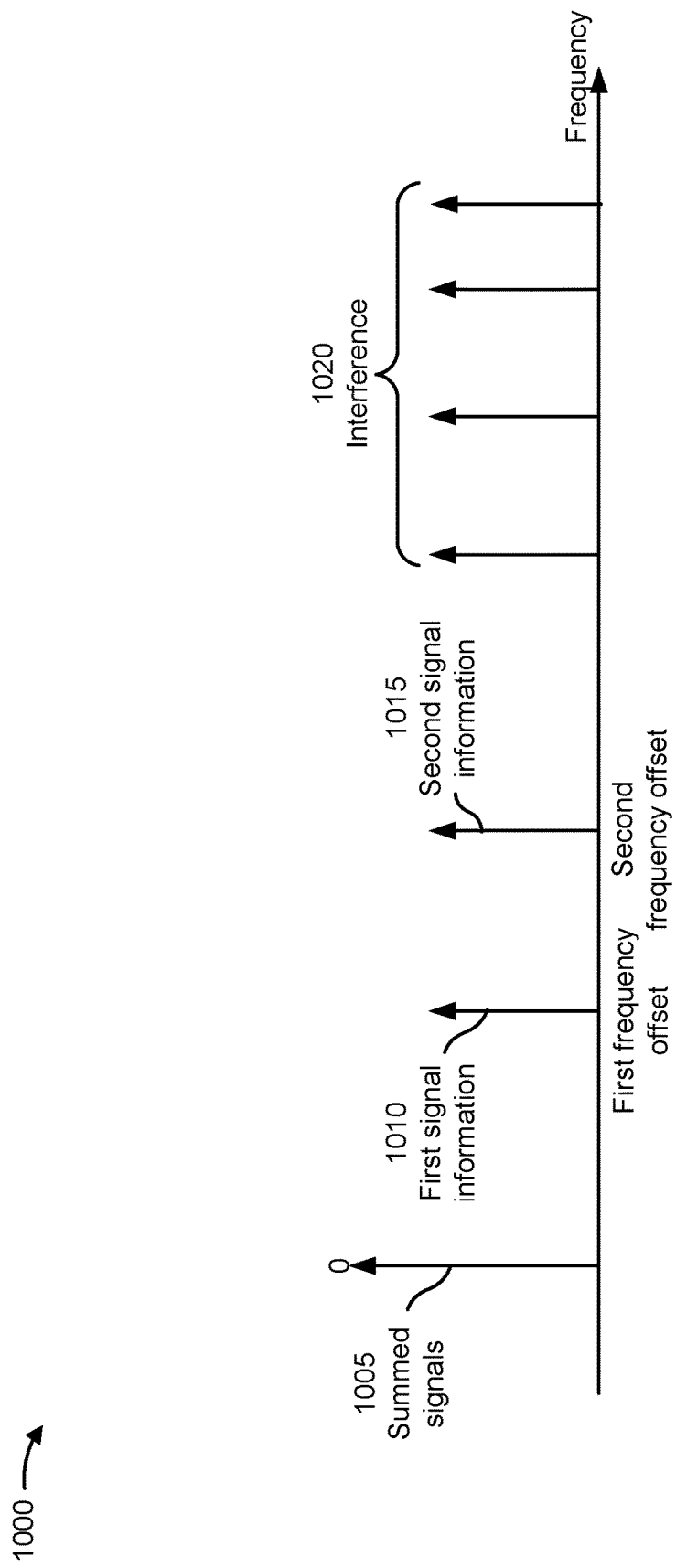
FIG. 10 is a diagram of an example associated with envelope tracking decoding from multiple signals, in accordance with the present disclosure.

FIG. 10 is a diagram of an example 1000 associated with envelope tracking decoding from multiple signals, in accordance with the present disclosure. Example 1000 depicts a received signal at a receiver (e.g., the third network entity 815) when multiple signals are received by the receiver (e.g., when multiple transmitters, such as the first network entity 805 and the second network entity 810, transmit signals at the same time or at least partially overlapping times). FIG. 10 depicts an example where two signals are received by the receiver. However, the techniques and operations described herein may be similarly applied to examples where more than two signals are received by the receiver.

As described in more detail elsewhere herein, each signal may be transmitted with a communication and a helper signal separated in the frequency domain by a frequency offset. For example, the received signal may be associated with a first signal (e.g., that includes a first communication (e.g., first data) and a first helper signal separated in the frequency domain by a first frequency offset) and a second signal (e.g., that includes a second communication (e.g., second data) and a second helper signal separated in the frequency domain by a second frequency offset). For example, the first signal may be represented as $s_1(t)=a_1(t)\cos(\pi f_{d1}t)+a_{h_1}\cos(2f_{h_1}t)$, where $a_1(t)$ is a value of information (e.g., an information bit) of the first communication at a time t for the first signal, $f_{d1}$ is a frequency associated with the first communication, $a_{h_1}$ is a value of the first helper signal (e.g., a known or fixed value, such as "1"), and $f_{h_1}$ is a frequency associated with the first helper signal. The second signal may be represented as $s_2(t)=a_2(t)\cos(2\pi f_{d2}t)+a_{h_2}\cos(2f_{h_2}t)$, where $a_2(t)$ is a value of information (e.g., an information bit) of the second communication at a time t for the second signal, $f_{d2}$ is a frequency associated with the second communication, $a_{h_2}$ is a value of the second helper signal (e.g., a known or fixed value, such as "1"), and $f_{h_2}$ is a frequency associated with the second helper signal.

As described elsewhere herein, values of $f_{d1}$, $f_{d2}$, the first frequency offset $\Delta f_1$ (e.g., where $\Delta f_1=f_{h_1}-f_{d1}$), and the second frequency offset $\Delta f_2$ (e.g., where $\Delta f_2=f_{h_2}-f_{d2}$) may be determined, selected, or negotiated based on, in accordance with, or otherwise associated with one or more conditions. The one or more conditions may ensure that terms of the received signal (e.g., depicted in FIG. 10) are sufficiently separated in the frequency domain to enable the receiver (e.g., the third network entity 815) to isolate and/or separate information associated with a particular communication or data when the received signal is a summation of multiple signals.

For example, as shown in FIG. 10, the received signal may include a first term associated with summed signals 1005 at a first frequency domain location (e.g., shown as "0" in FIG. 10). For example, the summed signals 1005 may be $a_1^2(t)+a_2^2(t)+a_{h_1}^2+a_{h_2}^2$. Because the receiver may not know information or values associated with the first communication ($a_1(t)$) or the second communication ($a_2(t)$), the receiver may be unable to decode the first communication or the second communication via envelope tracking using the summed signals 1005. The received signal may include a second term associated with first signal information 1010. The first signal information 1010 may include information such as $2a_1(t)a_{h_1}\cos(2\pi\Delta f_1 t)$. The first signal information 1010 may be used by the receiver to decode the first communication ($a_1(t)$) because a value of $a_n$ is known and/or fixed and because the receiver may receive an indication of the value of $\Delta f_1$. As shown in FIG. 10, the first signal information 1010 may be associated with a frequency domain location that is separated from the summed signals 1005 by the value of the first frequency offset $\Delta f_1$.

To decode the first communication, the receiver may modify an envelope of the received signal to isolate the first signal information 1010. For example, the receiver may shift the envelope and/or the received signal by the first frequency offset $\Delta f_1$, such that the first signal information 1010 is located at a reference frequency (e.g., a DC frequency, shown as "0" in FIG. 10). As another example, the receiver may apply a bandpass filter to isolate the first signal information 1010. The receiver may obtain the first communication using the first signal information 1010 by applying envelope tracking decoding, as described in more detail elsewhere herein.

The received signal may include a third term associated with second signal information 1015. The second signal information 1015 may include information such as $2a_2(t)a_{h_1}\cos(2\pi\Delta f_2 t)$. The second signal information 1015 may be used by the receiver to decode the second communication ($a_2(t)$) because a value of $a_{h_2}$ is known and/or fixed and because the receiver may receive an indication of the value of $\Delta f_2$. As shown in FIG. 10, the second signal information 1015 may be associated with a frequency domain location that is separated from the summed signals 1005 by the value of the second frequency offset $\Delta f_2$. To decode the second communication, the receiver may modify an envelope of the received signal to isolate the second signal information 1015. For example, the receiver may shift the envelope and/or the received signal by the second frequency offset $\Delta f_2$, such that the second signal information 1015 is located at the reference frequency (e.g., a DC frequency, shown as "0" in FIG. 10). As another example, the receiver may apply a bandpass filter to isolate the second signal information 1015. The receiver may obtain the second communication using the second signal information 1015 by applying envelope tracking decoding, as described in more detail elsewhere herein.

The received signal may include one or more terms associated with interference 1020. For example, the interference 1020 may result from the first signal and the second signal. Values of $f_{d_1}$, $f_{d_2}$, the first frequency offset $\Delta f_1$ (e.g., where $\Delta f_1 = f_{h_1} - f_{d_1}$), and the second frequency offset $\Delta f_2$ (e.g., where $\Delta f_2 = f_{h_2} - f_{d_2}$) may be determined, selected, or negotiated based on, in accordance with, or otherwise associated with the one or more conditions, such that the interference 1020 results in frequency domain locations that do not overlap with the summed signals 1005, the first signal information 1010, and the second signal information 1015. Additionally, the values of $f_{d_1}$, $f_{d_2}$, the first frequency offset $\Delta f_1$ (e.g., where $\Delta f_1 = f_{h_1} - f_{d_1}$), and the second frequency offset $\Delta f_2$ (e.g., where $\Delta f_2 = f_{h_2} - f_{d_2}$) may be determined, selected, or negotiated based on, in accordance with, or otherwise associated with the one or more conditions, such that the interference 1020 occurs at frequency domain locations having higher frequency values than frequency values associated with the summed signals 1005, the first signal information 1010, and the second signal information 1015. As a result, the interference 1020 may be removed or filtered via a lowpass filter applied by the receiver when decoding the received signal.

For example, the interference 1020 may be removed or mitigated because $\Delta f_2 > \Delta f_1 + \Delta d$ and because $f_{h_2} - f_{d_1} = \Delta f_2 + f_{d_2} - f_{d_1}$ and $f_{h_1} - f_{d_2} = \Delta f_1 + f_{d_1} - f_{d_2}$. This may result in the interference 1020 occurring in a frequency range that is outside of $\Delta f_1 + \Delta d$ and outside of $\Delta f_2 + \Delta d$. In other words, the conditions may ensure that the interference 1020 occurs at least a channel bandwidth (or a data bandwidth) away from the first signal information 1010 and the second signal information 1015. This ensures that the receiver is able to filter and/or remove the interference 1020 (e.g., via a lowpass filter) when decoding the first signal or the second signal.

As indicated above, FIG. 10 is provided as an example. Other examples may differ from what is described with respect to FIG. 10.

Figure 11:
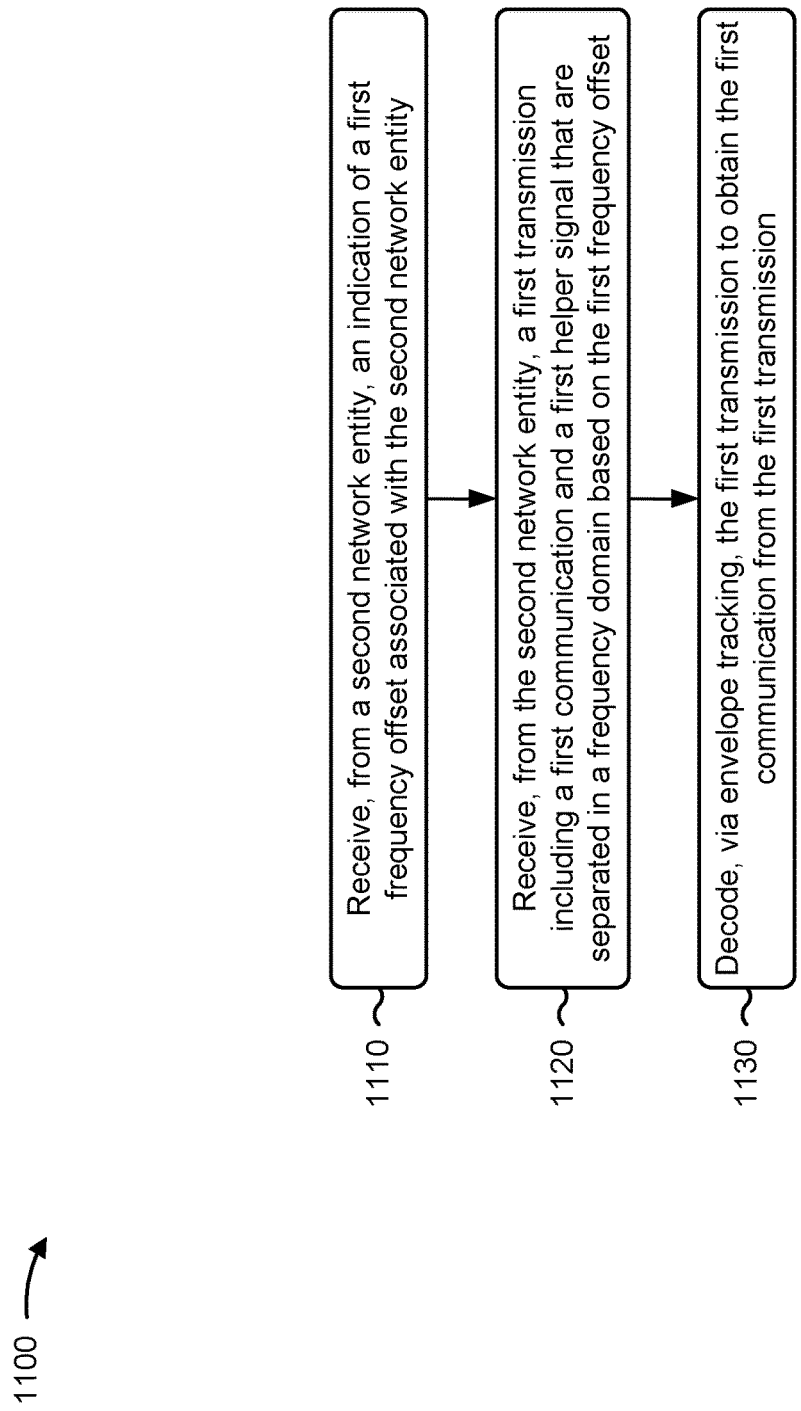
FIG. 11 is a diagram illustrating an example process performed, for example, by a first network node, in accordance with the present disclosure.

FIG. 11 is a diagram illustrating an example process 1100 performed, for example, by a first network node, in accordance with the present disclosure. Example process 1100 is an example where the first network entity (e.g., the third network entity 815, the network entity 102, the network entity 104, the network entity 106, the apparatus 200, the network node 310, the UE 320, the network entity 402, the network entity 404) performs operations associated with helper signal based envelope tracking.

As shown in FIG. 11, in some aspects, process 1100 may include receiving, from a second network entity, an indication of a first frequency offset associated with the second network entity (block 1110). For example, the first network entity (e.g., using reception component 1302 and/or communication manager 1308, depicted in FIG. 13) may receive, from a second network entity, an indication of a first frequency offset associated with the second network entity, as described above.

As further shown in FIG. 11, in some aspects, process 1100 may include receiving, from the second network entity, a first transmission including a first communication and a first helper signal that are separated in a frequency domain based on the first frequency offset (block 1120). For example, the first network entity (e.g., using reception component 1302 and/or communication manager 1308, depicted in FIG. 13) may receive, from the second network entity, a first transmission including a first communication and a first helper signal that are separated in a frequency domain based on the first frequency offset, as described above.

As further shown in FIG. 11, in some aspects, process 1100 may include decoding, via envelope tracking, the first transmission to obtain the first communication from the first transmission (block 1130). For example, the first network entity (e.g., using communication manager 1308, depicted in FIG. 13) may decode, via envelope tracking, the first transmission to obtain the first communication from the first transmission, as described above.

Process 1100 may include additional aspects, such as any single aspect or any combination of aspects described below and/or in connection with one or more other processes described elsewhere herein.

In a first aspect, receiving the indication of the first frequency offset comprises receiving system information signaling including the indication of the first frequency offset.

In a second aspect, alone or in combination with the first aspect, the first frequency offset is associated with a bandwidth of the first communication.

In a third aspect, alone or in combination with one or more of the first and second aspects, process 1100 includes transmitting, to the second network entity, a capability report indicating one or more frequency offsets that are supported by the first network entity, wherein the first frequency offset is included in the one or more frequency offsets.

In a fourth aspect, alone or in combination with one or more of the first through third aspects, decoding the first transmission comprises performing, based on the first frequency offset, an operation associated with frequency domain resources of the first transmission.

In a fifth aspect, alone or in combination with one or more of the first through fourth aspects, decoding the first transmission comprises shifting, based on the first frequency offset, frequency domain resources of the first transmission by a value of the first frequency offset.

In a sixth aspect, alone or in combination with one or more of the first through fifth aspects, decoding the first transmission comprises detecting, via the envelope tracking, an envelope of the first transmission in the frequency domain, shifting, in the frequency domain, the envelope by the first frequency offset to obtain a modified envelope, applying a lowpass filter to the modified envelope, and obtaining the first communication associated with the modified envelope and a value of the first helper signal.

In a seventh aspect, alone or in combination with one or more of the first through sixth aspects, process 1100 includes receiving, from a third network entity, an indication of a second frequency offset associated with the third network entity, wherein the first frequency offset is different from the second frequency offset, and receiving, from the third network entity, a second transmission including a second communication and a second helper signal that are separated in the frequency domain based on the second frequency offset.

In an eighth aspect, alone or in combination with one or more of the first through seventh aspects, the first communication is an ASK modulated communication or a PSK modulated communication.

In a ninth aspect, alone or in combination with one or more of the first through eighth aspects, the first helper signal is a single tone at a fixed frequency.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
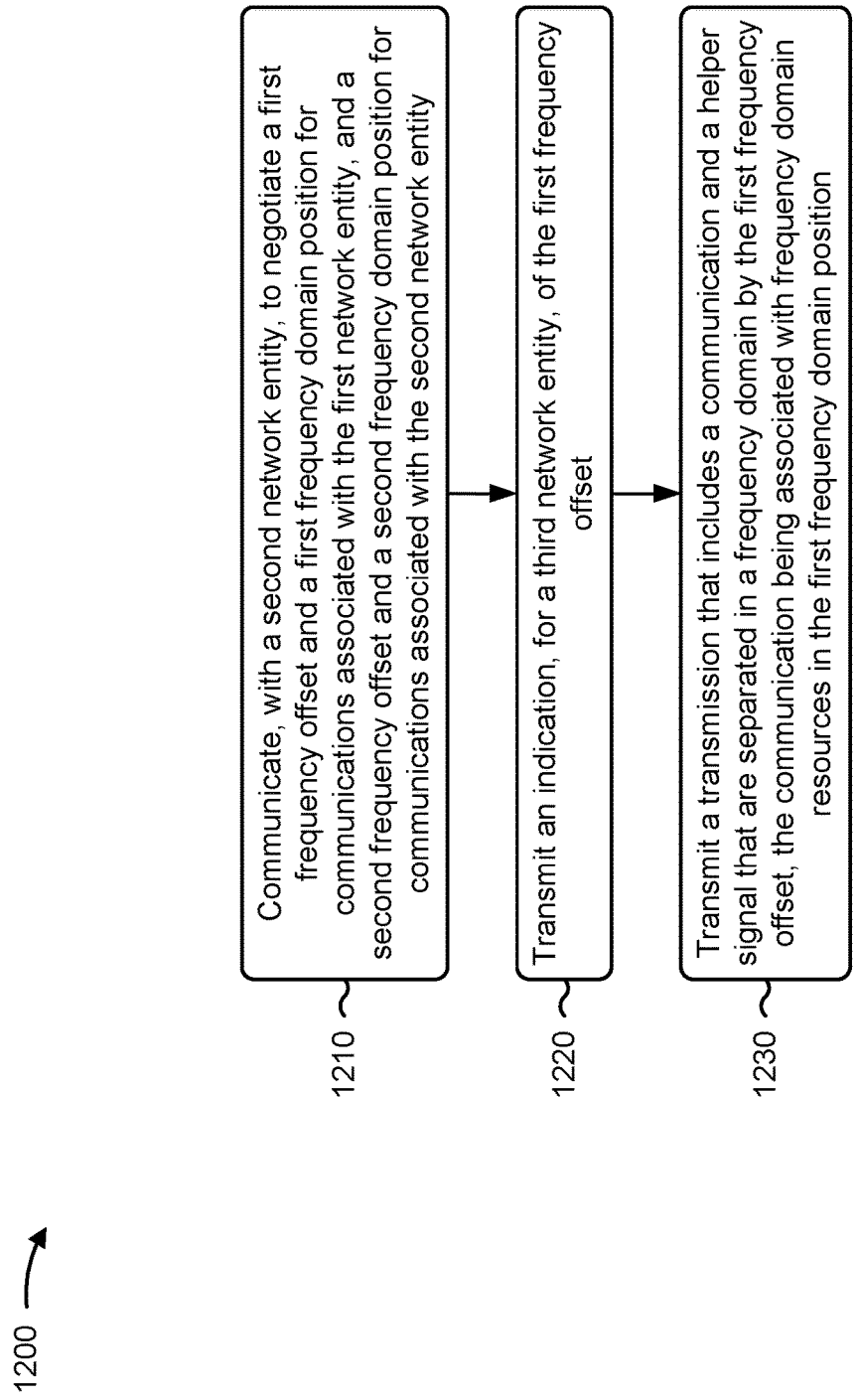
FIG. 12 is a diagram illustrating an example process performed, for example, by a first network node, in accordance with the present disclosure.

FIG. 12 is a diagram illustrating an example process 1200 performed, for example, by a first network node, in accordance with the present disclosure. Example process 1200 is an example where the first network entity (e.g., the first network entity 805, the second network entity 810, the network entity 102, the network entity 104, the network entity 106, the apparatus 200, the network node 310, the UE 320, the network entity 402, the network entity 404) performs operations associated with helper signal based envelope tracking.

As shown in FIG. 12, in some aspects, process 1200 may include communicating, with a second network entity, to negotiate a first frequency offset and a first frequency domain position for communications associated with the first network entity, and a second frequency offset and a second frequency domain position for communications associated with the second network entity (block 1210). For example, the first network entity (e.g., using reception component 1402, transmission component 1404, and/or communication manager 1408, depicted in FIG. 14) may communicate, with a second network entity, to negotiate a first frequency offset and a first frequency domain position for communications associated with the first network entity, and a second frequency offset and a second frequency domain position for communications associated with the second network entity, as described above.

As further shown in FIG. 12, in some aspects, process 1200 may include transmitting an indication, for a third network entity, of the first frequency offset (block 1220). For example, the first network entity (e.g., using transmission component 1404 and/or communication manager 1408, depicted in FIG. 14) may transmit an indication, for a third network entity, of the first frequency offset, as described above.

As further shown in FIG. 12, in some aspects, process 1200 may include transmitting a transmission that includes a communication and a helper signal that are separated in a frequency domain by the first frequency offset, the communication being associated with frequency domain resources in the first frequency domain position (block 1230). For example, the first network entity (e.g., using transmission component 1404 and/or communication manager 1408, depicted in FIG. 14) may transmit a transmission that includes a communication and a helper signal that are separated in a frequency domain by the first frequency offset, the communication being associated with frequency domain resources in the first frequency domain position, as described above.

Process 1200 may include additional aspects, such as any single aspect or any combination of aspects described below and/or in connection with one or more other processes described elsewhere herein.

In a first aspect, the first frequency offset, the first frequency domain position, the second frequency offset, and the second frequency domain position are associated with one or more conditions.

In a second aspect, alone or in combination with the first aspect, the one or more conditions include a value of the second frequency domain position being greater than or equal to a sum of the first frequency domain position, the first frequency offset, the second frequency offset, and a bandwidth of the communication.

In a third aspect, alone or in combination with one or more of the first and second aspects, the one or more conditions include the second frequency offset being greater than or equal to a sum of the first frequency offset and a bandwidth of the communication.

In a fourth aspect, alone or in combination with one or more of the first through third aspects, the one or more conditions are associated with a quantity of network entities, including the first network entity and the second network entity, that are communicating in a geographic region.

In a fifth aspect, alone or in combination with one or more of the first through fourth aspects, process 1200 includes determining, in accordance with the one or more conditions, at least one of the first frequency offset and the first frequency domain position, or the second frequency offset and the second frequency domain position.

In a sixth aspect, alone or in combination with one or more of the first through fifth aspects, transmitting the indication of the first frequency offset comprises transmitting the indication of the first frequency offset via system information signaling.

In a seventh aspect, alone or in combination with one or more of the first through sixth aspects, the first frequency offset is associated with a bandwidth of the communication.

In an eighth aspect, alone or in combination with one or more of the first through seventh aspects, process 1200 includes receiving a capability report indicating one or more frequency offsets that are supported by the third network entity, wherein the first frequency offset is included in the one or more frequency offsets.

In a ninth aspect, alone or in combination with one or more of the first through eighth aspects, the communication is an ASK modulated communication or a PSK modulated communication.

In a tenth aspect, alone or in combination with one or more of the first through ninth aspects, the helper signal is a single tone at a fixed frequency.

In an eleventh aspect, alone or in combination with one or more of the first through tenth aspects, communicating with the second network entity comprises at least one of transmitting information associated with negotiating at least one of the first frequency offset, the first frequency domain position, the second frequency offset, or the second frequency domain position, or receiving information associated with negotiating the at least one of first frequency offset, the first frequency domain position, the second frequency offset, or the second frequency domain position.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
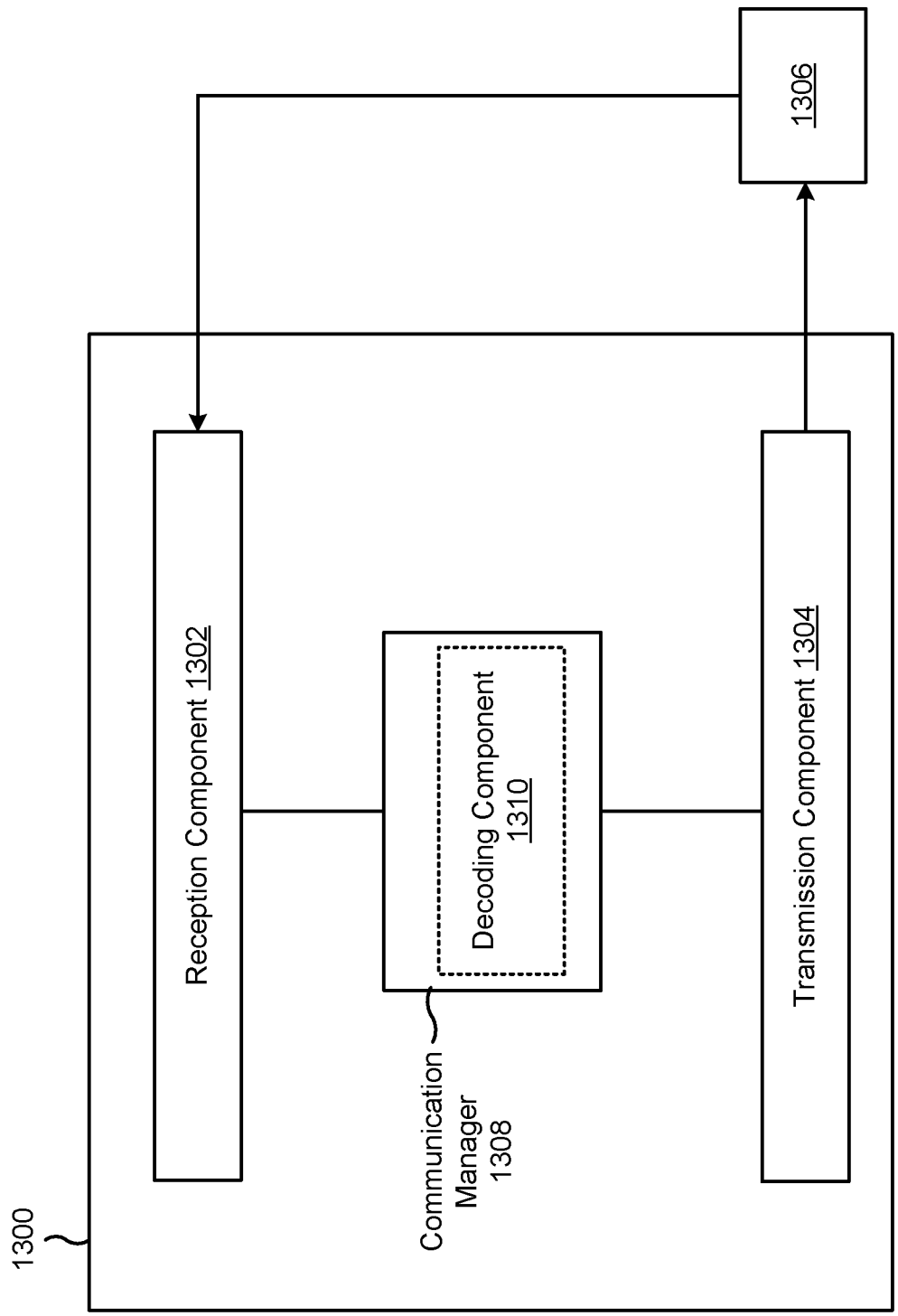
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a first network entity, or a first network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may be, or may be similar to, the communication manager 110, the communication manager 114, the communication manager 235, the communication manager 340, the communication manager 350, the communication manager 458, and/or the communication manager 460. The communication manager 1308 may include a decoding component 1310, among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the first network entity described in connection with FIG. 4. Additionally, or alternatively, one or more components shown in FIG. 13 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the first network entity described in connection with FIG. 4.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the first network entity described in connection with FIG. 4. In some aspects, the transmission component 1304 may be co-located with the reception component 1302 in a transceiver.

The reception component 1302 may receive, from a second network entity, an indication of a first frequency offset associated with the second network entity. The reception component 1302 may receive, from the second network entity, a first transmission including a first communication and a first helper signal that are separated in a frequency domain based on the first frequency offset. The decoding component 1310 may decode, via envelope tracking, the first transmission to obtain the first communication from the first transmission.

The transmission component 1304 may transmit, to the second network entity, a capability report indicating one or more frequency offsets that are supported by the first network entity, wherein the first frequency offset is included in the one or more frequency offsets.

The reception component 1302 may receive, from a third network entity, an indication of a second frequency offset associated with the third network entity, wherein the first frequency offset is different from the second frequency offset.

The reception component 1302 may receive, from the third network entity, a second transmission including a second communication and a second helper signal that are separated in the frequency domain based on the second frequency offset.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
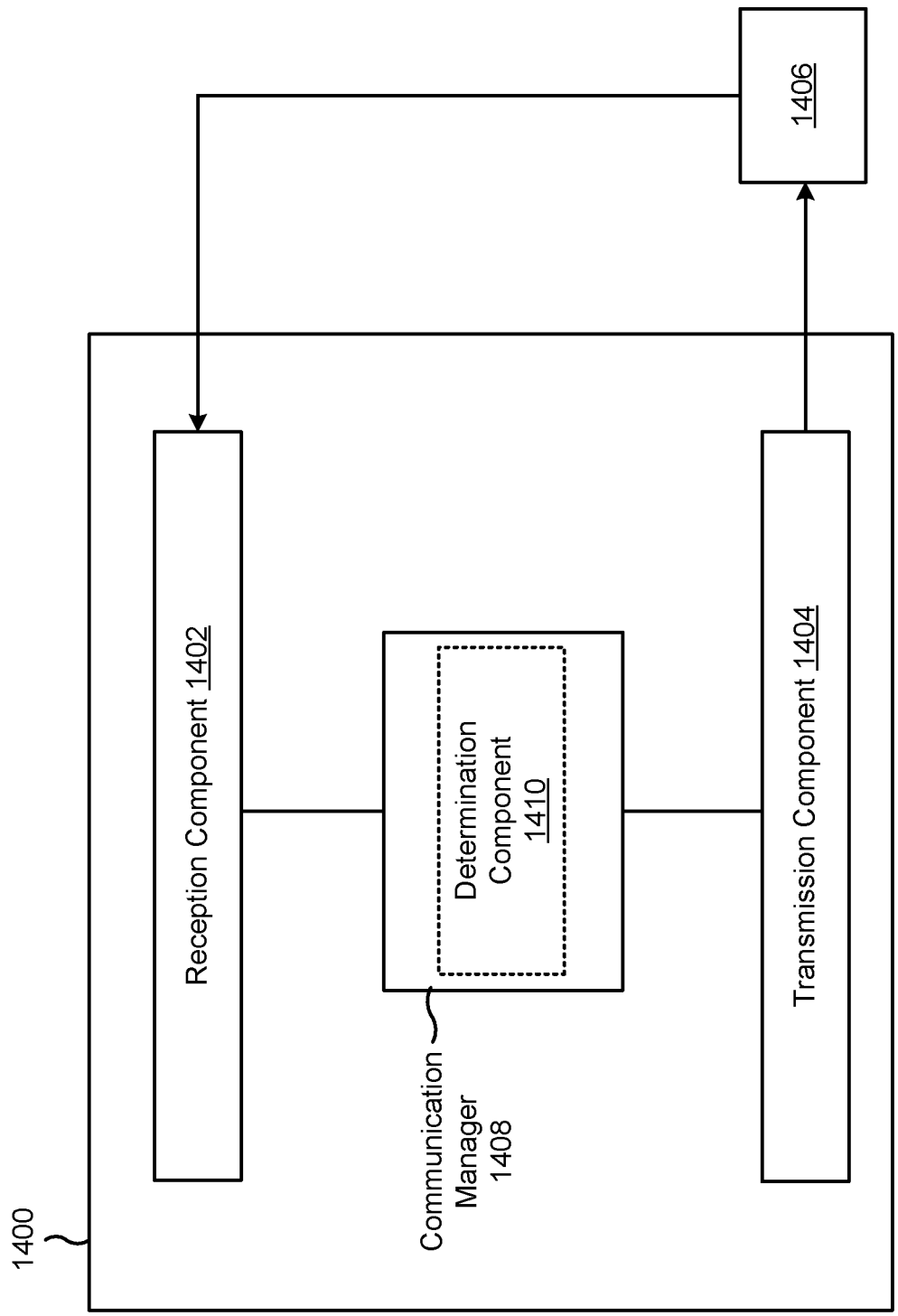
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a first network entity, or a first network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may be, or may be similar to, the communication manager 110, the communication manager 114, the communication manager 235, the communication manager 340, the communication manager 350, the communication manager 458, and/or the communication manager 460 The communication manager 1408 may include a determination component 1410, among other examples.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the first network entity described in connection with FIG. 4. Additionally, or alternatively, one or more components shown in FIG. 14 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the first network entity described in connection with FIG. 4.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the first network entity described in connection with FIG. 4. In some aspects, the transmission component 1404 may be co-located with the reception component 1402 in a transceiver.

The transmission component 1404 and/or the reception component 1402 may communicate, with a second network entity, to negotiate a first frequency offset and a first frequency domain position for communications associated with the first network entity, and a second frequency offset and a second frequency domain position for communications associated with the second network entity. The transmission component 1404 may transmit an indication, for a third network entity, of the first frequency offset. The transmission component 1404 may transmit a transmission that includes a communication and a helper signal that are separated in a frequency domain by the first frequency offset, the communication being associated with frequency domain resources in the first frequency domain position.

The determination component 1410 may determine, in accordance with the one or more conditions, at least one of the first frequency offset and the first frequency domain position, or the second frequency offset and the second frequency domain position.

The reception component 1402 may receive a capability report indicating one or more frequency offsets that are supported by the third network entity, wherein the first frequency offset is included in the one or more frequency offsets.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first network entity, comprising: receiving, from a second network entity, an indication of a first frequency offset associated with the second network entity; receiving, from the second network entity, a first transmission including a first communication and a first helper signal that are separated in a frequency domain based on the first frequency offset; and decoding, via envelope tracking, the first transmission to obtain the first communication from the first transmission.

Aspect 2: The method of Aspect 1, wherein receiving the indication of the first frequency offset comprises receiving system information signaling including the indication of the first frequency offset.

Aspect 3: The method of any of Aspects 1-2, wherein the first frequency offset is associated with a bandwidth of the first communication.

Aspect 4: The method of any of Aspects 1-3, further comprising: transmitting, to the second network entity, a capability report indicating one or more frequency offsets that are supported by the first network entity, wherein the first frequency offset is included in the one or more frequency offsets.

Aspect 5: The method of any of Aspects 1-4, wherein decoding the first transmission comprises: performing, based on the first frequency offset, an operation associated with frequency domain resources of the first transmission.

Aspect 6: The method of any of Aspects 1-5, wherein decoding the first transmission comprises: shifting, based on the first frequency offset, frequency domain resources of the first transmission by a value of the first frequency offset.

Aspect 7: The method of any of Aspects 1-6, wherein decoding the first transmission comprises: detecting, via the envelope tracking, an envelope of the first transmission in the frequency domain; shifting, in the frequency domain, the envelope by the first frequency offset to obtain a modified envelope; applying a lowpass filter to the modified envelope; and obtaining the first communication associated with the modified envelope and a value of the first helper signal.

Aspect 8: The method of any of Aspects 1-7, further comprising: receiving, from a third network entity, an indication of a second frequency offset associated with the third network entity, wherein the first frequency offset is different from the second frequency offset; and receiving, from the third network entity, a second transmission including a second communication and a second helper signal that are separated in the frequency domain based on the second frequency offset.

Aspect 9: The method of any of Aspects 1-8, wherein the first communication is an amplitude shift keying (ASK) modulated communication or a phase shift keying (PSK) modulated communication.

Aspect 10: The method of any of Aspects 1-9, wherein the first helper signal is a single tone at a fixed frequency.

Aspect 11: A method of wireless communication performed by a first network entity, comprising: communicating, with a second network entity, to negotiate a first frequency offset and a first frequency domain position for communications associated with the first network entity, and a second frequency offset and a second frequency domain position for communications associated with the second network entity; transmitting an indication, for a third network entity, of the first frequency offset; and transmitting a transmission that includes a communication and a helper signal that are separated in a frequency domain by the first frequency offset, the communication being associated with frequency domain resources in the first frequency domain position.

Aspect 12: The method of Aspect 11, wherein the first frequency offset, the first frequency domain position, the second frequency offset, and the second frequency domain position are associated with one or more conditions.

Aspect 13: The method of Aspect 12, wherein the one or more conditions include a value of the second frequency domain position being greater than or equal to a sum of the first frequency domain position, the first frequency offset, the second frequency offset, and a bandwidth of the communication.

Aspect 14: The method of any of Aspects 12-13, wherein the one or more conditions include the second frequency offset being greater than or equal to a sum of the first frequency offset and a bandwidth of the communication.

Aspect 15: The method of any of Aspects 12-14, wherein the one or more conditions are associated with a quantity of network entities, including the first network entity and the second network entity, that are communicating in a geographic region.

Aspect 16: The method of any of Aspects 12-15, further comprising: determining, in accordance with the one or more conditions, at least one of: the first frequency offset and the first frequency domain position, or the second frequency offset and the second frequency domain position.

Aspect 17: The method of any of Aspects 11-16, wherein transmitting the indication of the first frequency offset comprises: transmitting the indication of the first frequency offset via system information signaling.

Aspect 18: The method of any of Aspects 11-17, wherein the first frequency offset is associated with a bandwidth of the communication.

Aspect 19: The method of any of Aspects 11-18, further comprising: receiving a capability report indicating one or more frequency offsets that are supported by the third network entity, wherein the first frequency offset is included in the one or more frequency offsets.

Aspect 20: The method of any of Aspects 11-19, wherein the communication is an amplitude shift keying (ASK) modulated communication or a phase shift keying (PSK) modulated communication.

Aspect 21: The method of any of Aspects 11-20, wherein the helper signal is a single tone at a fixed frequency.

Aspect 22: The method of any of Aspects 11-21, wherein communicating with the second network entity comprises at least one of: transmitting information associated with negotiating at least one of the first frequency offset, the first frequency domain position, the second frequency offset, or the second frequency domain position; or receiving information associated with negotiating the at least one of first frequency offset, the first frequency domain position, the second frequency offset, or the second frequency domain position.

Aspect 23: An apparatus for wireless communication at a device, comprising one or more processors; memory coupled with the processor; and instructions stored in the memory and executable by the processor to cause the apparatus to perform the method of one or more of Aspects 1-22.

Aspect 24: A device for wireless communication, comprising one or more memories and one or more processors coupled to the one or more memories, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by one or more processors to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

Aspect 28: A device for wireless communication, comprising one or more communication interfaces and one or more processors coupled to the one or more communication interfaces, the device configured to perform the method of one or more of Aspects 1-22.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, because those skilled in the art understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. As another example, "determining" can include resolving, selecting, obtaining, choosing, establishing and other such similar actions.

Even though particular combinations of features are recited in the claims and/or disclosed in the specification, these combinations do not limit the scope of the disclosure. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" covers a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein is critical or essential unless explicitly described as such. Also, as used herein, the articles "a" and "an" include one or more items and may be used interchangeably with "one or more." Further, as used herein, the article "the" includes one or more items referenced in connection with the article "the" and may be used interchangeably with "the one or more." Furthermore, as used herein, the terms "set" and "group" include one or more items and may be used interchangeably with "one or more." Where only one item is intended, the phrase "only one" or similar language is used. Also, as used herein, the terms "has," "have," "having," or the like are open-ended terms that do not limit an element that they modify (e.g., an element "having" A may also have B). Further, as used herein, "based on" is in the inclusive sense, unless otherwise explicitly indicated. For example, "based on" may be used interchangeably with "based at least in part on," "associated with", or "in accordance with" unless otherwise explicitly indicated. The phrase "based on" shall not be construed as a reference to a closed set of information, one or more conditions, one or more factors, or the like. Specifically, unless a phrase refers to "based on only 'a'" or the equivalent in context, whatever it is that is "based on 'a'" or "based at least in part on 'a'" may be based on "a" alone or based on a combination of "a" and one or more other factors, conditions or information. Also, as used herein, the term "or" is inclusive when used in a series and may be used interchangeably with "and/or," unless explicitly stated otherwise (e.g., if used in combination with "either" or "only one of").

What is claimed is:

1. A first network entity for wireless communication, comprising:
   one or more communication interfaces; and
   one or more processors coupled to the one or more communication interfaces, wherein the first network entity is configured to:
   receive, via the one or more communication interfaces and from a second network entity, an indication of a first frequency offset associated with the second network entity;
   receive, via the one or more communication interfaces and from the second network entity, a first transmission including a first communication and a first helper signal that are separated in a frequency domain based on the first frequency offset; and
   decode, via envelope tracking, the first transmission to obtain the first communication from the first transmission.

2. The first network entity of claim 1, wherein, to receive the indication of the first frequency offset, the first network entity is configured to receive, via the one or more communication interfaces, system information signaling including the indication of the first frequency offset.

3. The first network entity of claim 1, wherein the first frequency offset is associated with a bandwidth of the first communication.

4. The first network entity of claim 1, wherein the first network entity is configured to:
   cause the one or more communication interfaces to transmit, to the second network entity, a capability report indicating one or more frequency offsets that are supported by the first network entity,
   wherein the first frequency offset is included in the one or more frequency offsets.

5. The first network entity of claim 1, wherein, to decode the first transmission, the first network entity is configured to:
   perform, based on the first frequency offset, an operation associated with frequency domain resources of the first transmission.

6. The first network entity of claim 1, wherein, to decode the first transmission, the first network entity is configured to:
   shift, based on the first frequency offset, frequency domain resources of the first transmission by a value of the first frequency offset.

7. The first network entity of claim 1, wherein, to decode the first transmission, the first network entity is configured to:
   detect, via the envelope tracking, an envelope of the first transmission in the frequency domain;
   shift, in the frequency domain, the envelope by the first frequency offset to obtain a modified envelope;
   apply a lowpass filter to the modified envelope; and obtain the first communication associated with the modified envelope and a value of the first helper signal.

8. The first network entity of claim 1, wherein the first network entity is configured to:
receive, via the one or more communication interfaces and from a third network entity, an indication of a second frequency offset associated with the third network entity, wherein the first frequency offset is different from the second frequency offset; and
receive, via the one or more communication interfaces and from the third network entity, a second transmission including a second communication and a second helper signal that are separated in the frequency domain based on the second frequency offset.

9. The first network entity of claim 1, wherein the first communication is an amplitude shift keying (ASK) modulated communication or a phase shift keying (PSK) modulated communication.

10. The first network entity of claim 1, wherein the first helper signal is a single tone at a fixed frequency.

11. A first network entity for wireless communication, comprising, comprising:
one or more communication interfaces; and
one or more processors coupled to the one or more communication interfaces, wherein the first network entity is configured to:
cause the one or more communication interfaces to communicate, with a second network entity, to negotiate a first frequency offset and a first frequency domain position for communications associated with the first network entity, and a second frequency offset and a second frequency domain position for communications associated with the second network entity;
cause the one or more communication interfaces to transmit an indication, for a third network entity, of the first frequency offset; and
cause the one or more communication interfaces to transmit a transmission that includes a communication and a helper signal that are separated in a frequency domain by the first frequency offset, the communication being associated with frequency domain resources in the first frequency domain position.

12. The first network entity of claim 11, wherein the first frequency offset, the first frequency domain position, the second frequency offset, and the second frequency domain position are associated with one or more conditions.

13. The first network entity of claim 12, wherein the one or more conditions include a value of the second frequency domain position being greater than or equal to a sum of the first frequency domain position, the first frequency offset, the second frequency offset, and a bandwidth of the communication.

14. The first network entity of claim 12, wherein the one or more conditions include the second frequency offset being greater than or equal to a sum of the first frequency offset and a bandwidth of the communication.

15. The first network entity of claim 12, wherein the one or more conditions are associated with a quantity of network entities, including the first network entity and the second network entity, that are communicating in a geographic region.

16. The first network entity of claim 12, wherein the first network entity is configured to:
determine, in accordance with the one or more conditions, at least one of:
the first frequency offset and the first frequency domain position, or
the second frequency offset and the second frequency domain position.

17. A method of wireless communication performed by a first network entity, comprising:
receiving, from a second network entity, an indication of a first frequency offset associated with the second network entity;
receiving, from the second network entity, a first transmission including a first communication and a first helper signal that are separated in a frequency domain based on the first frequency offset; and
decoding, via envelope tracking, the first transmission to obtain the first communication from the first transmission.

18. The method of claim 17, wherein receiving the indication of the first frequency offset comprises receiving system information signaling including the indication of the first frequency offset.

19. The method of claim 17, wherein the first frequency offset is associated with a bandwidth of the first communication.

20. The method of claim 17, further comprising:
transmitting, to the second network entity, a capability report indicating one or more frequency offsets that are supported by the first network entity,
wherein the first frequency offset is included in the one or more frequency offsets.

21. The method of claim 17, wherein decoding the first transmission comprises:
performing, based on the first frequency offset, an operation associated with frequency domain resources of the first transmission.

22. The method of claim 17, wherein decoding the first transmission comprises:
shifting, based on the first frequency offset, frequency domain resources of the first transmission by a value of the first frequency offset.

23. The method of claim 17, wherein decoding the first transmission comprises:
detecting, via the envelope tracking, an envelope of the first transmission in the frequency domain;
shifting, in the frequency domain, the envelope by the first frequency offset to obtain a modified envelope;
applying a lowpass filter to the modified envelope; and
obtaining the first communication associated with the modified envelope and a value of the first helper signal.

24. The method of claim 17, wherein the first helper signal is a single tone at a fixed frequency.

25. A method of wireless communication performed by a first network entity, comprising:
communicating, with a second network entity, to negotiate a first frequency offset and a first frequency domain position for communications associated with the first network entity, and a second frequency offset and a second frequency domain position for communications associated with the second network entity;
transmitting an indication, for a third network entity, of the first frequency offset; and
transmitting a transmission that includes a communication and a helper signal that are separated in a frequency domain by the first frequency offset, the communication being associated with frequency domain resources in the first frequency domain position.

26. The method of claim 25, wherein transmitting the indication of the first frequency offset comprises:

transmitting the indication of the first frequency offset via system information signaling.

27. The method of claim 25, wherein the first frequency offset is associated with a bandwidth of the communication.

28. The method of claim 25, further comprising:
receiving a capability report indicating one or more frequency offsets that are supported by the third network entity,
wherein the first frequency offset is included in the one or more frequency offsets.

29. The method of claim 25, wherein the communication is an amplitude shift keying (ASK) modulated communication or a phase shift keying (PSK) modulated communication.

30. The method of claim 25, wherein communicating with the second network entity comprises at least one of:
transmitting information associated with negotiating at least one of the first frequency offset, the first frequency domain position, the second frequency offset, or the second frequency domain position; or
receiving information associated with negotiating the at least one of first frequency offset, the first frequency domain position, the second frequency offset, or the second frequency domain position.

* * * * *